(12) United States Patent
Yano et al.

(10) Patent No.: US 8,351,073 B2
(45) Date of Patent: Jan. 8, 2013

(54) IMAGE FORMING APPARATUS AND COLOR DEVIATION CORRECTING METHOD AND PROGRAM

(75) Inventors: Takashi Yano, Suntou-gun (JP); Hisashi Enomoto, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 1070 days.

(21) Appl. No.: 12/327,164

(22) Filed: Dec. 3, 2008

(65) Prior Publication Data

US 2009/0147286 A1 Jun. 11, 2009

(30) Foreign Application Priority Data

Dec. 7, 2007 (JP) .................................. 2007-317107

(51) Int. Cl.
*H04N 1/04* (2006.01)
(52) U.S. Cl. .......................... 358/1.7; 358/481; 358/480
(58) Field of Classification Search .................... 358/1.7, 358/481, 480
See application file for complete search history.

(56) References Cited

U.S. PATENT DOCUMENTS 7,535,612 B2 * 5/2009 Shoji ............................ 347/259
2007/0070173 A1 * 3/2007 Yamakawa et al. ........... 347/241

FOREIGN PATENT DOCUMENTS

| JP | 2000-218860 | 8/2000 |
|---|---|---|
| JP | 2003-207976 | 7/2003 |
| JP | 2005-234099 | 9/2005 |

OTHER PUBLICATIONS

U.S. Appl. No. 12/479,547, filed Jun. 5, 2009, Applicants: Takaaki Yano, et al.

* cited by examiner

*Primary Examiner* — Houshang Safaipour
(74) *Attorney, Agent, or Firm* — Fitzpatrick, Cella, Harper & Scinto

(57) ABSTRACT

The invention has an image forming apparatus with a deviation amount calculator for obtaining, by an arithmetic operation, by an arithmetic operation, the deviation amount between the laser beam irradiating positions for each color, under the condition that the deviation amount increases gradually according to a time lapse in at least one of the plurality of operating modes, according with a further time lapse, the deviation amount between the laser beam irradiating positions for each color decreases gradually, and according with a further time lapse, the deviation amount between the laser beam irradiating positions for each color is converged.

12 Claims, 15 Drawing Sheets

ACTUAL MEASUREMENT RESULTS OF FLUCTUATION
OF LASER BEAM IRRADIATING POSITION

CALCULATION RESULTS BY PREDICTION ALGORITHM

FIG. 5

| STATION(s) | PARAMETER | OPERATING MODE(m) | | | | |
|---|---|---|---|---|---|---|
| | | 1: STANDBY | 2: SLEEP | 3: INTRA-APPARATUS COOLING | 4: PRINT 1 | 5: PRINT 2 | ... |
| Y | a1 | | | | | |
| | a2 | | | | | |
| | b1 | | | | | |
| | b2 | | | | | |
| M | a1 | | | | | |
| | a2 | | | | | |
| | b1 | | | | | |
| | b2 | | | | | |
| C | a1 | | | | | |
| | a2 | | | | | |
| | b1 | | | | | |
| | b2 | | | | | |
| K | a1 | | | | | |
| | a2 | | | | | |
| | b1 | C | | B | | A |
| | b2 | | | | | |

*$a_1$, $a_2$, $b_1$, AND $b_2$ ARE CONSTANT PARAMETERS OF THE ALGORITHM FUNCTION $F[s,m](t)$

RELATIVE COLOR DEVIATION CONVERSION OF
PREDICTION RESULTS (YELLOW REFERENCE)

OUTLINE OF METHOD OF CORRECTION CONTROL
BASED ON PREDICTION

COLOR DEVIATION ACTUAL MEASUREMENT RESULTS
IN THE CASE WHERE CORRECTION CONTROL IS APPLIED

PRESUMPTION COLOR DEVIATION IN THE CASE
WHERE CORRECTION CONTROL IS NOT APPLIED

DIFFERENCE OF LASER BEAM IRRADIATING POSITION
FLUCTUATIONS ACCORDING TO PRINT CONDITIONS (YELLOW)

RESULTS OF PREDICTION CALCULATIONS TO WHICH
TEMPERATURE FEEDBACK HAS BEEN APPLIED

DIFFERENCE OF LASER BEAM IRRADIATING POSITION FLUCTUATIONS ACCORDING TO LEAVING STATE OF OUTPUT PAPER (YELLOW)

RESULTS OF PREDICTION CALCULATION TO WHICH TEMPERATURE FEEDBACK HAS BEEN APPLIED

TEMPERATURE CHANGES IN THE CASE WHERE
OUTPUT PAPER HAS BEEN LEFT ON TRAY

TEMPERATURE CHANGES IN THE CASE WHERE
OUTPUT PAPER ON TRAY HAS BEEN REMOVED

CASE WHERE CORRELATION WITH TEMPERATURE CHANGE HAS BEEN FOUND OUT

CASE WHERE IT IS DIFFICULT TO FIND OUT CORRELATION WITH TEMPERATURE CHANGE

IMAGE FORMING APPARATUS AND COLOR DEVIATION CORRECTING METHOD AND PROGRAM

BACKGROUND OF THE INVENTION

1. Field of the Invention

The present invention relates to an image forming apparatus, a color deviation correcting method, and its program and, more particularly, to a mechanism for predicting a deviation amount regarding a laser beam irradiating position in an image forming apparatus.

2. Description of the Related Art

In an image forming apparatus for forming a color image by overlaying toner images of a plurality of colors, from a viewpoint of quality of a product, it is important that the image of each color is accurately printed at a predetermined position on a printed matter, that is, no color deviation occurs. There are various factors of the color deviation. As one of the factors which exert a large influence, there is a fluctuation in laser beam irradiating position on a photosensitive material which occurs in association with a thermal deformation of an optical unit.

A description will be made with reference to a schematic cross sectional view of an optical unit 10 illustrated in FIG. 14. Generally, the optical unit has such construction that a laser beam irradiated from each of light emitting sources 56 (optical elements) is reflected by a rotating polygon mirror 57, thereby scanning. The laser beam is reflected by a mirror a few times for a time interval until the laser beam emitted from each light emitting source 56 reaches each photosensitive drum 12, a progressing direction of the laser beam is changed, and a spot and a scanning width can be adjusted through a lens.

Those mechanical elements which decide an optical path L of the laser beam are fixed to a frame which forms the optical unit 10. When a thermal deformation occurs in the frame by a temperature elevation associated with the operation of the image forming apparatus, positions of those elements also change and a direction of the laser optical path L changes. The change in direction of the optical path is increased in proportion to an optical path length until the laser beam reaches the photosensitive drum 12. Therefore, even if the frame deformation of the optical unit 10 is very small, the change in optical path direction appears as a fluctuation of a laser beam irradiating position 53. The fluctuation of the laser beam irradiating position associated with such a temperature elevation phenomenon is called a thermal shift of the laser beam irradiating position.

An intra-apparatus temperature elevation of the image forming apparatus (intra-machine temperature elevation), and a self temperature elevation of the optical unit 10 caused by heat generation of a motor for driving the polygon mirror 57 have been recognized hitherto as factors which cause the laser beam irradiating position to fluctuate.

As a method of certainly correcting the color deviation caused by those factors, there is a method of performing a calibration for matching laser beam irradiating timing of each color. The calibration denotes such a process that a calibration pattern is formed onto an intermediate transfer material by a toner image and by reading the calibration pattern by a sensor, writing timing of each color is made coincident. However, the calibration cannot be frequently performed in consideration of a time necessary for the calibration, an influence on lives of consumables as well as toner consumption, and the like.

Therefore, a method whereby a temperature sensor and a color deviation correcting unit for presuming the fluctuation in laser beam irradiating position based on an output of the temperature sensor and correcting the laser beam irradiating timing are provided, and the color deviation is corrected without performing the calibration has been proposed. As a typical construction for realizing such a method, there is such a construction that a temperature of the optical unit itself is detected by a temperature sensor and the laser beam irradiating position is corrected by a correction control unit (for example, refer to Japanese Patent Application Laid-Open No. 2000-218860). There are also such a construction that an intra-apparatus temperature is detected by a temperature sensor and the laser beam irradiating position is corrected by a correction control unit based on a detection result and the like (for example, refer to Japanese Patent Application Laid-Open No. 2003-207976 and Japanese Patent Application Laid-Open No. 2005-234099).

Those methods are based on such a design idea that the temperature of a portion which exerts an influence on the thermal shift is measured and the laser beam irradiating position is corrected according to a temperature change. In the case where the temperature change and a color deviation tendency can be approximated by a one-to-one correspondence relation, it can be said that such a method is a very simple correcting method. FIG. 15A illustrates a graph of a case where a correlation between the change in laser beam irradiating position and the temperature change can be found out. A curve drawn by a thin solid line indicates a time-dependent change of the intra-apparatus temperature. A curve drawn by a bold solid line indicates a time-dependent change of the laser beam irradiating position fluctuation.

However, in the actual product, for a time interval until the color deviation fluctuation is converged, a correlation between a fluctuation increase or decrease in the laser beam irradiating position and a temperature increase or decrease cannot be always easily found out. The fluctuation increase and the fluctuation decrease mentioned here denote a relative relation and if any one direction is assumed to be an increase direction, the other is set to a decrease direction. The conventional color deviation correcting method or predicting method of the laser beam irradiating position cannot be applied to such a case. As a specific example, a case where in spite of the fact that the temperature of the portion which exerts an influence on the thermal shift is continuously rising, the direction of the color deviation fluctuation is reversed from the forward direction to the reverse direction or vice versa in such a step corresponds to such a case. FIG. 15B illustrates a graph of a case where it is difficult to find out a correlation between the change in laser beam irradiating position (deviation according to the temperature change) and the temperature change. A thin solid line indicates a time-dependent change of the intra-apparatus temperature. A bold solid line indicates a time-dependent change of the laser beam irradiating position fluctuation. It is difficult to find out a correlation between the fluctuation tendency of the laser beam irradiating position and the temperature change of a portion around the optical unit.

It is considered that the construction of the image forming unit of the conventional image forming apparatus is related to a background in which the predicting method mentioned in the related art has been used. Hitherto, a construction in which the optical unit which can scan only one laser beam is exclusively provided for every color as a light source of the laser beam necessary to form a color image is a mainstream. Since such a construction of the optical unit is simple, the temperature change and the fluctuation of the laser beam irradiating position can be easily approximated by the one-to-one relation. Since the optical unit of the same construction is used every color, the thermal shifts of the laser beam irradiating positions exhibit a similar tendency in all colors and a relative difference between the colors can be easily found out.

SUMMARY OF THE INVENTION

However, in recent years, in order to realize miniaturization and low costs which are required for the image forming apparatus, it is necessary to remarkably decrease a size in image forming unit and reduce the number of parts. A construction in which one optical unit can scan a plurality of laser beams is a mainstream. Such an optical unit has a very complicated structure as compared with the structure in the related art. For example, the number and shapes of the mirrors and lenses through which the laser beam passes for a time interval when the laser beam emitted from the light source reaches the surface of the photosensitive drum differ every color. Further, the portions where those optical elements are fixed to the optical unit and its peripheral structure also differ. Due to those factors, there is also a case where the fluctuation of the laser beam irradiating position associated with the temperature change shows a different tendency every color.

The invention is made by considering the foregoing points and it is an object of the invention that even in the case where it is difficult to find out a correlation between the optical unit and its peripheral temperature change, the fluctuation of a laser beam irradiating position for color deviation correction is precisely predicted.

Embodiments of the present invention are provided to overcome the above-described drawbacks of the related technology.

According to an aspect of the present invention, an image forming apparatus has the following construction.

An image forming apparatus which has a plurality of photosensitive members corresponding to respective colors for forming a color image, a plurality of optical elements that irradiate laser beams to the plurality of photosensitive members, and a plurality of operating modes including a print mode for executing a printing operation and a standby mode in which the apparatus is now on standby, in which a deviation amount of a laser beam irradiating position of the optical element changes gradually due to an influence of a heat in the apparatus, said apparatus and a color deviation is corrected based on the deviation amount obtained by a deviation amount calculation, said apparatus comprising: a deviation amount calculator configured to obtain, by an arithmetic operation, the deviation amount between the laser beam irradiating positions for each color, under the condition that the deviation amount increases gradually according to a time lapse in at least one of the plurality of operating modes, according with a further time lapse, the deviation amount between the laser beam irradiating positions for each color decreases gradually, and according with a further time lapse, the deviation amount between the laser beam irradiating positions for each color is converged.

According to the invention, even when it is difficult to find out the correlation between an optical unit and its peripheral temperature change, a fluctuation of the laser beam irradiating position for the color deviation correction can be precisely predicted. That is, by using the invention, with respect to the color deviation caused by the fluctuation of the laser beam irradiating position, the color deviation correction can be realized irrespective of the presence or absence of a correlation between the intra-apparatus temperature and the color deviation fluctuation tendency. Thus, the high quality image creation with little color deviation can be realized.

Values of parameters which are applied to an algorithm are individually set every color and every operating mode, so that it is possible to flexibly cope with complicated thermal shift characteristics.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram for describing an image of a parameter table which is used in an algorithm function based on the invention.

DESCRIPTION OF THE EMBODIMENTS

A preferred embodiment of the present invention will now be described in detail with reference to the drawings. It should be noted that the relative arrangement of the components, the numerical expressions and numerical values set forth in those embodiments do not limit the scope of the present invention unless it is specifically stated otherwise.

An embodiment 1 of the invention will now be described with reference to FIGS. 1 to 8B.

<Cross Sectional View of Printer>

Figure 1:
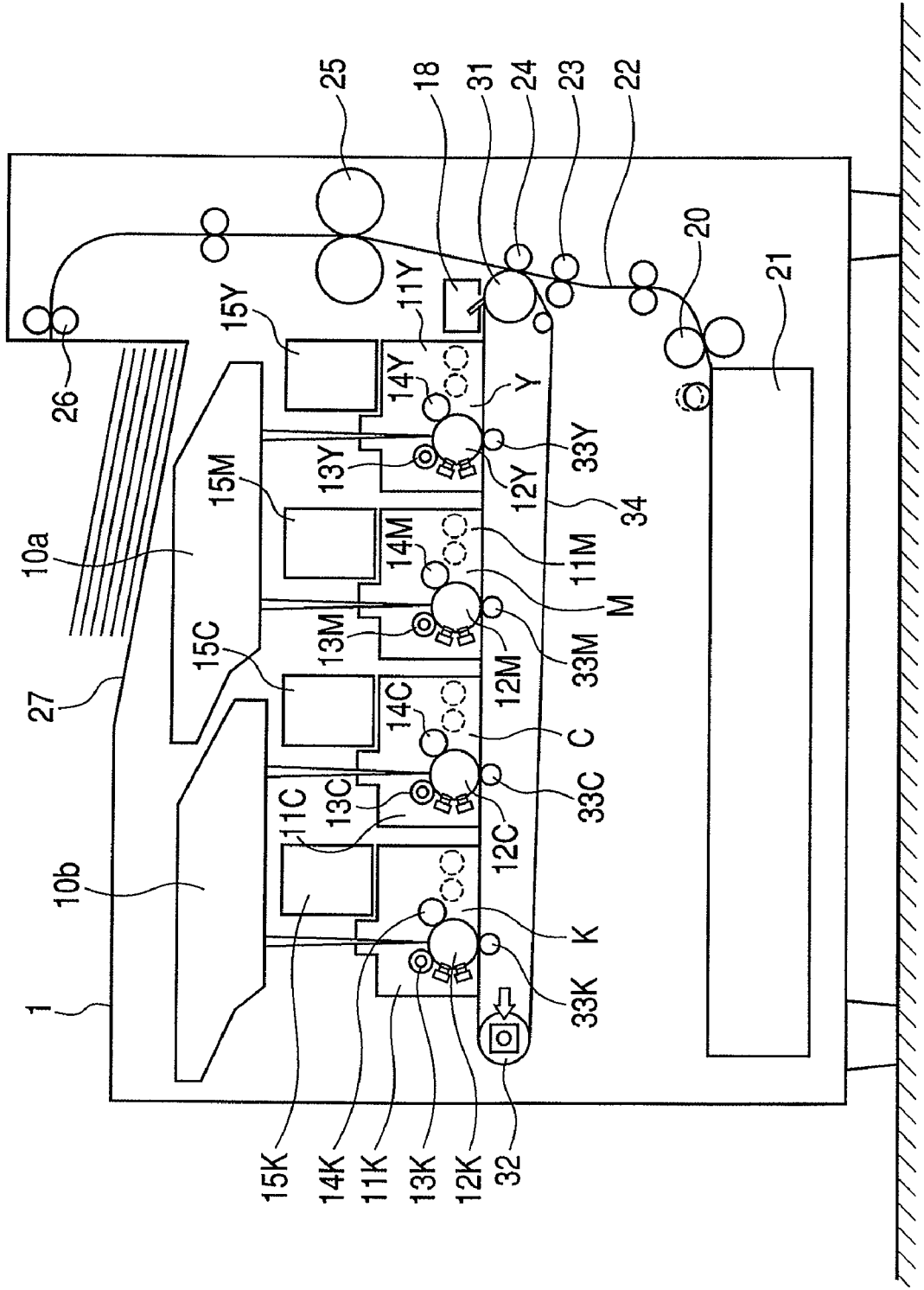
FIG. 1 is a schematic cross sectional view of an image forming apparatus to which the invention is applied.

FIG. 1 is a schematic cross sectional view of an image forming apparatus to which the invention is applied. Engine portions for forming primary images of total four colors of yellow, magenta, cyan, and black (hereinbelow, abbreviated to Y, M, C, and K) are arranged in an upper portion of a printer main body 1.

Print data transmitted from an external apparatus such as a PC (personal computer) is received by a video controller for controlling the printer main body 1 and output as write image data to a laser scanner (optical unit) 10 corresponding to each color. The laser scanner 10 irradiates a laser beam onto photosensitive drums 12Y, 12M, 12C, and 12K (hereinbelow, reference numerals in which Y, M, C, and K are omitted are used in the case where it is unnecessary to particularly specify the color) and draws a light image according to the write image data. In the image forming apparatus of the embodiment, the light image is written by using two laser scanners of a first scanner 10a for irradiating the laser beams for yellow and magenta and a second scanner 10b for irradiating the laser beams for cyan and black. The first scanner 10a and the second scanner 10b use such a construction that the laser beams of two stations are scanned by the one polygon mirror 57. That is, the laser scanner in the embodiment uses a construction as illustrated in a schematic cross sectional view in FIG. 14. Since FIG. 14 has already been described in the related art, a description about a construction shown by each reference numeral is omitted and it is assumed that the same reference numerals are also used in the embodiment.

In each of the stations of Y, M, C, and K, the engine portion is constructed by: a toner cartridge 15 for supplying toner; and a process cartridge 11 for forming a primary image. The process cartridge 11 is constructed by: the photosensitive drum 12; a charging unit 13 for uniformly charging the surface of the photosensitive drum 12; a developing unit 14; and a cleaner (not shown). The laser scanner 10 (the first scanner 10a, the second scanner 10b) draws a light image onto the surface of the photosensitive drums 12 charged by the charging unit 13, so that an electrostatic latent image is formed. The developing unit 14 develops the electrostatic latent image to a toner image and the toner image is transferred onto an intermediate transfer belt 34. After the toner image was transferred, the cleaner removes the toner remaining on the photosensitive drum 12. A primary transfer roller 33 for transferring the toner image developed on the surface of the photosensitive drum 12 onto the intermediate transfer belt 34 is arranged at a position opposite to the photosensitive drum 12.

The toner image (primary image) transferred onto the intermediate transfer belt 34 is transferred again onto a sheet by a secondary transfer roller 31 and a secondary transfer outer roller 24. The secondary roller 31 also serves as a driving roller of the intermediate transfer belt 34, and the secondary transfer outer roller 24 faces the secondary transfer roller 31. That is, this portion is a secondary transfer portion. The toner remaining on the intermediate transfer belt 34 without being transferred onto the sheet by the secondary transfer portion is collected by an intermediate transfer belt cleaner 18. A driven roller 32 is rotated in association with a rotation of the intermediate transfer belt 34 and also plays a role as a tension roller which applies a moderate tension to the intermediate transfer belt 34 by an urging force of a spring (not shown).

A sheet feeding unit 20 is located on the uppermost stream side of the sheet conveyance and arranged in a lower portion of the apparatus. When the sheets stacked and enclosed on a sheet feeding tray 21 are fed one by one by the sheet feeding unit 20, the sheet passes through a vertical conveying path 22 and is conveyed to the downstream side. A registration roller pair 23 is provided for the vertical conveying path 22. A final skew correction of the sheet is made here and image writing timing in an image forming unit and sheet conveying timing are matched here.

A fixing unit 25 for fixing the toner image on the sheet as a permanent image is provided on the downstream side of the image forming unit. The downstream of the fixing unit 25 is branched to: an ejection conveying path subsequent to a discharge roller 26 for ejecting the sheet out of the printer main body 1; and a conveying path subsequent to a reversing roller (not shown) and a duplex conveying path (not shown). The sheet ejected by the discharge roller 26 is stacked onto a discharge tray 27 provided outside of the printer 1.

<Constructional Diagram of General Hardware of Printer>

Figure 2:
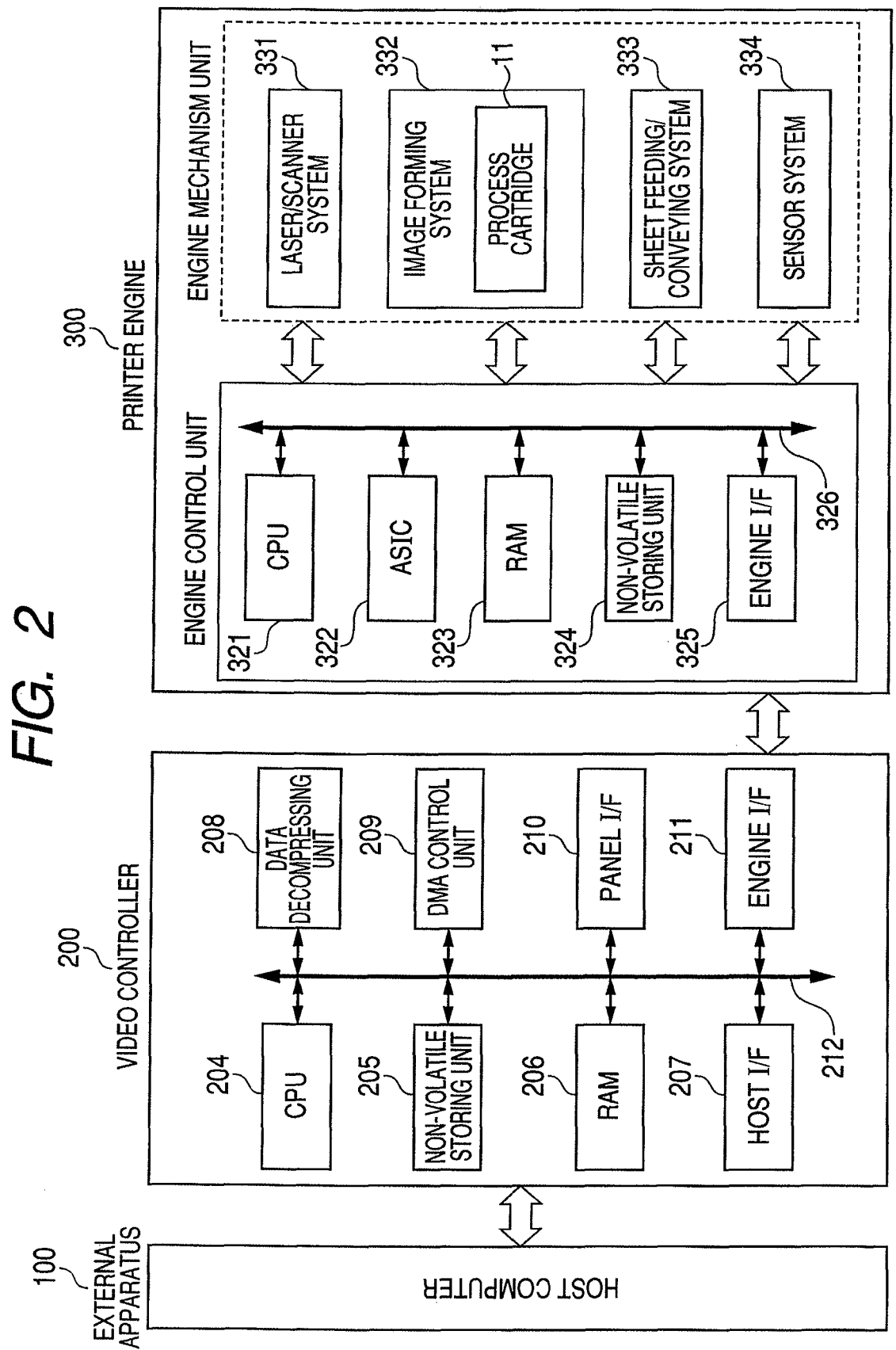
FIG. 2 is a constructional diagram of general hardware of a printer.

A general hardware construction of the printer will now be described with reference to FIG. 2.

<Video Controller 200>

First, a video controller 200 will be described. A CPU 204 controls the whole video controller. A non-volatile storing unit 205 stores various control codes which are executed by the CPU 204 and corresponds to a ROM, an EEPROM, a hard disk, or the like. An RAM 206 is a memory for temporary storage which functions as a main memory, a work area, or the like of the CPU 204.

A host interface unit (written as a host I/F in the diagram) 207 is an input/output unit for transmitting and receiving print data and control data to/from an external apparatus 100 such as a host computer. The print data received by the host I/F 207 is stored as compression data into the RAM 206. A data decompressing unit 208 decompresses the compression data. The data decompressing unit 208 decompresses arbitrary compression data stored in the RAM 206 to the image data line by line. The decompressed image data is stored into the RAM 206.

A DMA (Direct Memory Access) control unit 209 transfers the image data in the RAM 206 to an engine interface unit (written as an engine I/F in the diagram) 211 by an instruction sent from the CPU 204. The DMA control unit 209 also transfers arbitrary compression data in the RAM 206 to the data decompressing unit 208 or transfers the image data which is output from the data decompressing unit 208 to the engine I/F 211.

From a panel unit provided for the printer main body 1, a panel interface unit (written as a panel I/F in the diagram) 210 receives various settings which are made by the operator and instructions which are sent from the operator.

The engine I/F 211 is an input/output unit for transferring and receiving a signal to/from a printer engine 300. The engine I/F 211 allows a data signal to be transmitted from an output buffer register (not shown) and makes communication control with the printer engine 300.

A system bus 212 has an address bus and a data bus. The foregoing component elements are connected to the system bus 212 and can access mutually.

<Printer Engine 300>

Subsequently, the printer engine 300 will be described. The printer engine 300 is constructed mainly by: an engine control unit (surrounded by a solid line in the diagram); and an engine mechanism unit (surrounded by a broken line in the diagram). The engine mechanism unit is a portion which operates by various instructions from the engine control unit. First, details of the engine mechanism unit will be described and, thereafter, the engine control unit will be described in detail.

A laser/scanner system 331 includes a laser light emitting element, a laser driver circuit, a scanner motor, a polygon mirror, and a scanner driver. The laser/scanner system 331 forms a latent image onto the photosensitive drum 12 by exposing and scanning the photosensitive drum 12 by the laser beam according to the image data sent from the video controller 200.

An image forming system 332 is a principal portion of the image forming apparatus and forms the toner image based on the latent image formed on the photosensitive drum 12 onto the sheet. The image forming system 332 is constructed by: process elements such as process cartridge 11, intermediate transfer belt 34, fixing unit 25, and the like; and a high voltage power source circuit for forming various kinds of biases (high voltages) upon forming the image.

A charge removing unit, charging unit 13, developing unit 14, and photosensitive drum 12 are included in the process cartridge 11. A non-volatile memory tag is also provided for the process cartridge 11 and a CPU 321 or an ASIC 322 writes and reads various kinds of information into/from the memory tag.

A sheet feeding/conveying system 333 feeds and conveys the sheet and is constructed by various conveying system motors, sheet feeding tray 21, discharge tray 27, various conveying rollers (discharge roller 26 and the like), and the like.

A sensor system 334 is a group of sensors for collecting information necessary for the CPU 321 or ASIC 322, which will be described hereinafter, to control the laser/scanner system 331, image forming system 332, and sheet feeding/conveying system 333. At least, the following various kinds of sensors which have already been well-known are included in the sensor group: for example, a temperature sensor of the fixing unit 25; a toner residual amount detecting sensor; a concentration sensor for detecting a concentration of the image; a sheet size sensor; a sheet leading edge detecting sensor; and a sheet conveyance detecting sensor. The information detected by those various kinds of sensors is fetched by the CPU 321 and used for print sequence control. Although the sensor system 334 in the diagram has separately been disclosed with respect to the laser/scanner system 331, image forming system 332, and sheet feeding/conveying system 333, those systems may be included in any one of the mechanisms.

Subsequently, the engine control unit will be described. The CPU 321 uses a RAM 323 as a main memory and a work area and controls the above-described engine mechanism unit according to various kinds of control programs stored in a non-volatile storing unit 324. More specifically speaking, the CPU 321 drives the laser/scanner system 331 based on the print control command and the image data which were input from the video controller 200 through the engine I/F 211 and an engine I/F 325. The CPU 321 also controls various kinds of print sequences by controlling the image forming system 332 and the sheet feeding/conveying system 333. The CPU 321 also obtains information necessary for controlling the image forming system 332 and the sheet feeding/conveying system 333 by driving the sensor system 334.

The ASIC 322 controls each motor necessary for executing the various print sequences as mentioned above and controls a high voltage power source such as a developing bias based on instructions from the CPU 321.

A part or all of the functions of the CPU 321 may be executed by the ASIC 322 or, contrarily, a part or all of the functions of the ASIC 322 can be also executed by the CPU 321. In addition, another dedicated hardware may be provided and a part of the functions of the CPU 321 and the ASIC 322 may be executed by the dedicated hardware.

A system bus 326 has an address bus and a data bus. The component elements of the engine control unit are connected to the system bus 326 and can access mutually.

<With Respect to Occurrence of Color Deviation>

Figure 14:
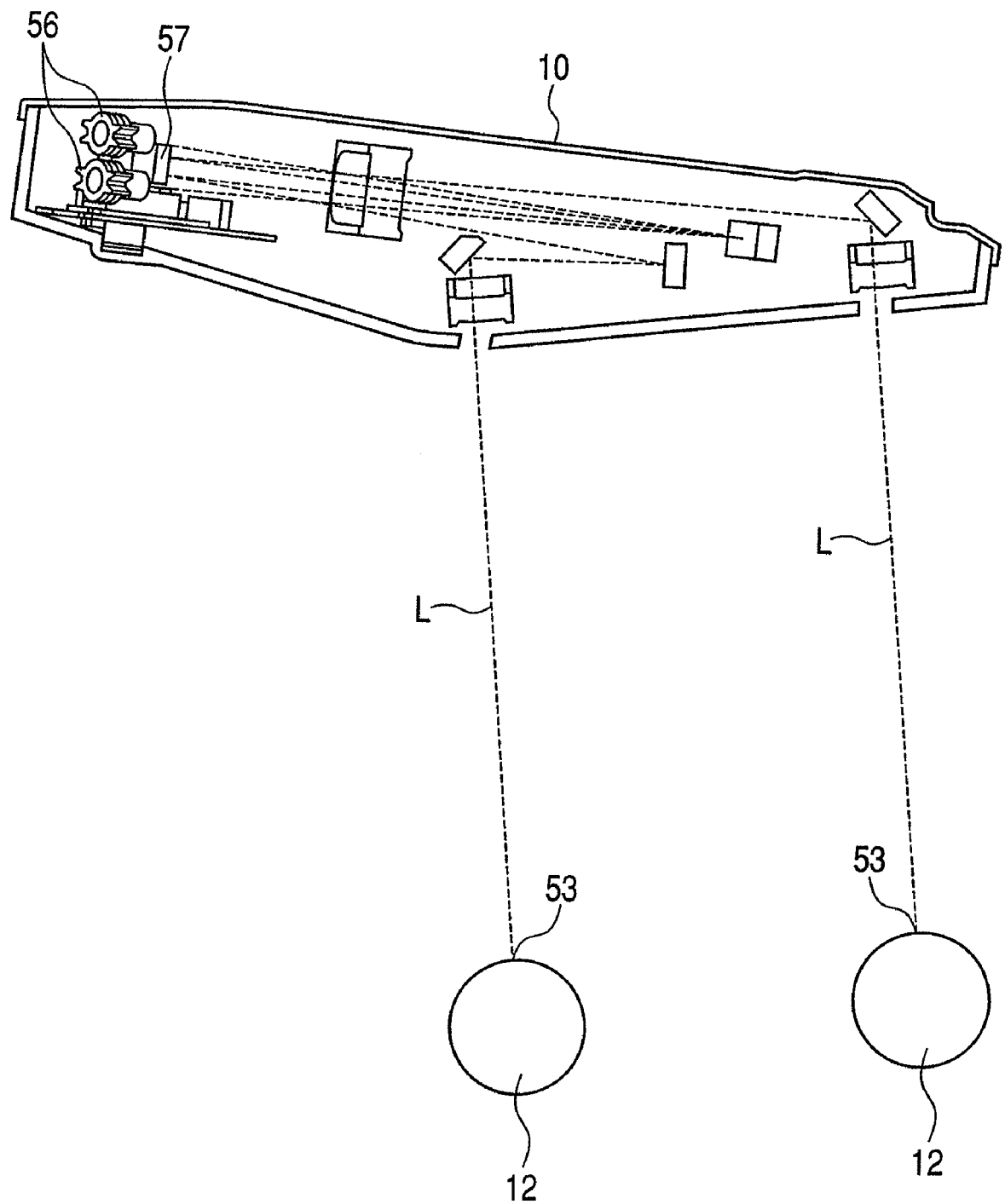
FIG. 14 is a schematic cross sectional view of an optical unit.
Figure 15A:
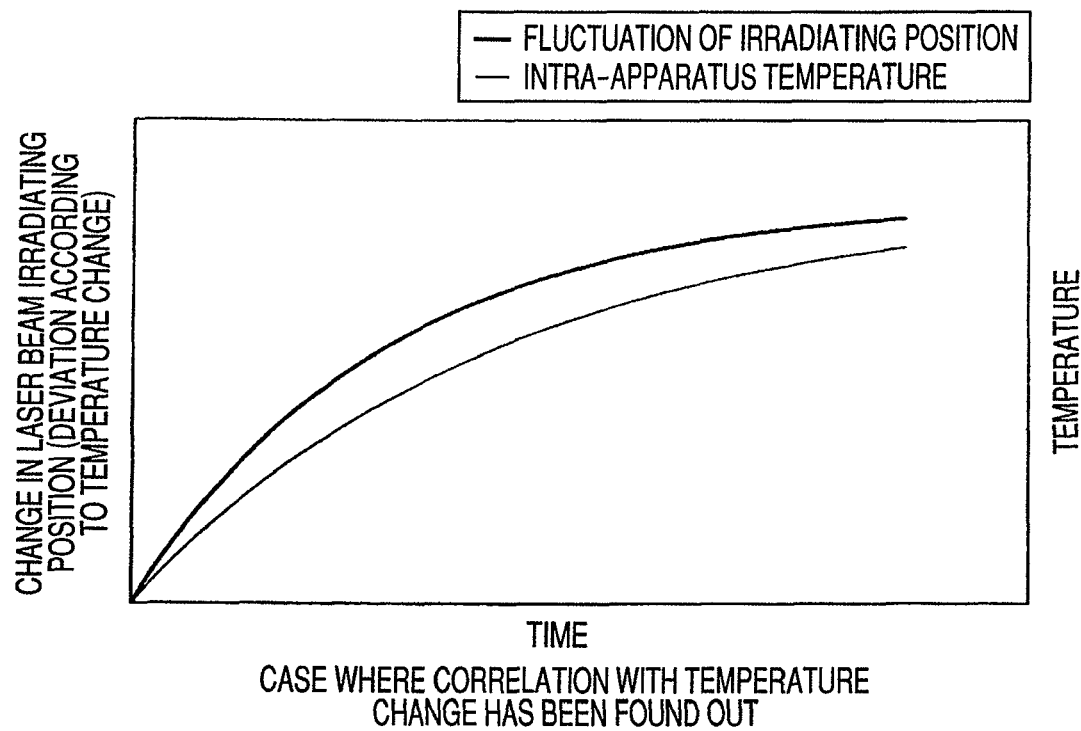
FIG. 15A is a diagram illustrating a case where a correlation between a change in laser beam irradiating position and a temperature change can be found out.
Figure 15B:
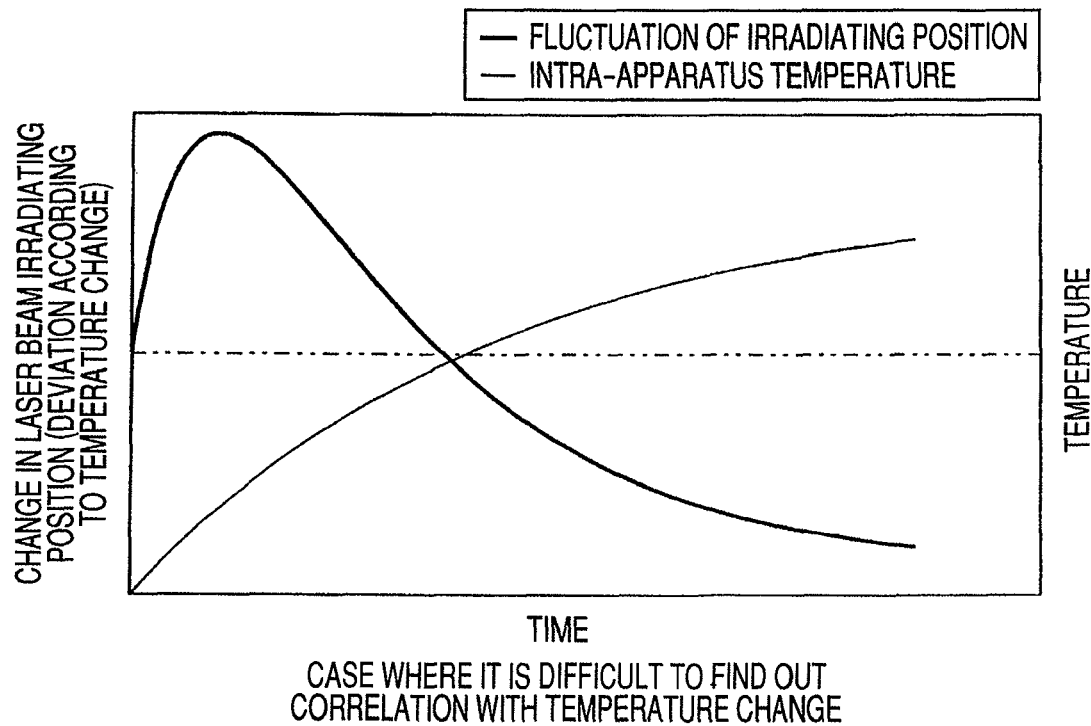
FIG. 15B is a diagram illustrating a case where it is difficult to find out the correlation between the change in laser beam irradiating position and the temperature change.

As described in FIG. 1, in the image forming apparatus of the embodiment, the laser scanner in which the laser beams for two stations are scanned by one polygon mirror is used. That is, the image forming apparatus has the first scanner 10a for yellow and magenta and the second scanner 10b for cyan and black. When a temperature change occurs in the apparatus, the laser beam irradiating position on the surface of the photosensitive drum 12 fluctuates in the sub-scanning direction (sheet conveying direction) in association with a micro thermal deformation of the laser scanner. In the construction of the embodiment, as illustrated in FIG. 14, since the two laser beams of the laser scanner pass through the optical elements having different structures for a time interval until the laser beams emitted from the light sources reach the surface of the photosensitive drum 12, irradiating position fluctuation characteristics of those laser beams differ. Although the first scanner 10a and the second scanner 10b use the same laser scanner unit, conditions of heat sources around the laser scanner differ. It is, therefore, difficult to predict a correlation between a fluctuation increase or decrease in the laser beam irradiating position and a temperature increase or decrease. In addition, the fluctuation characteristics of the laser beam irradiating positions also do not coincide between the colors. By such an influence, a relative color deviation associated with the intra-apparatus temperature elevation occurs among the colors of Y, M, C, and K. In the image forming apparatus of the embodiment, by using the color deviation correcting method based on the invention, the color deviation phenomenon is corrected, thereby realizing good image quality. Its details will be described hereinbelow.

<Specific Example of Color Deviation>

Figure 3A:
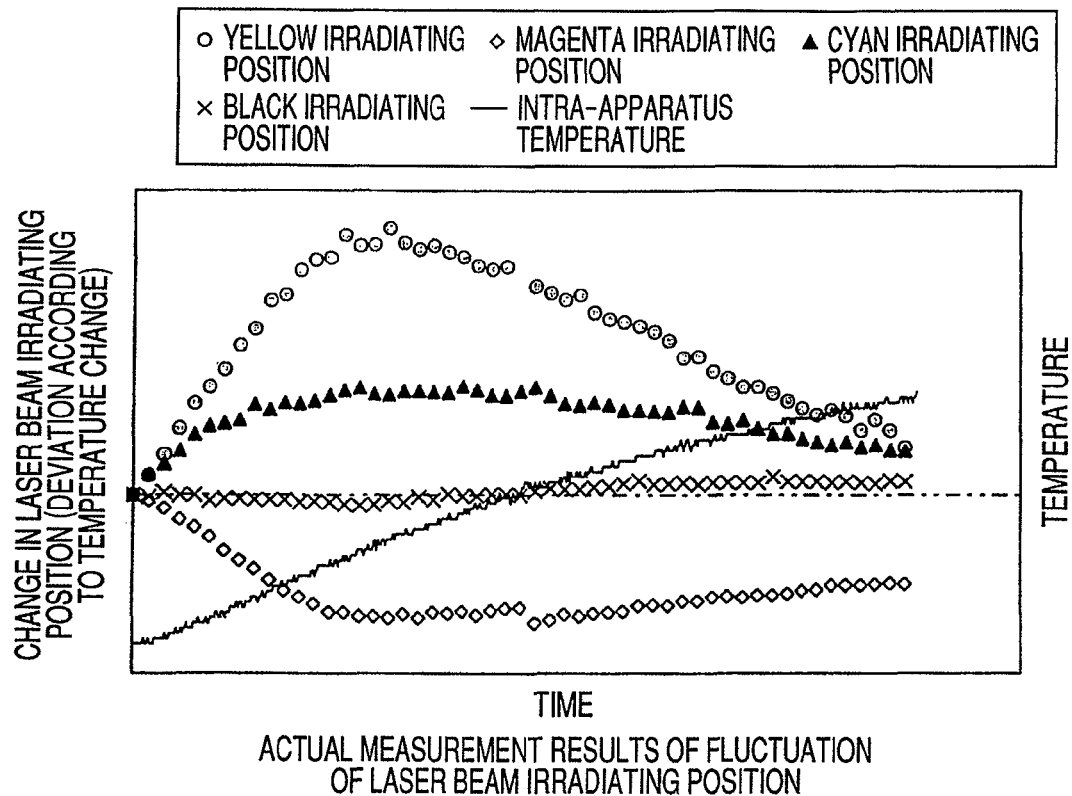
FIG. 3A is a diagram illustrating actual measurement results of a laser beam irradiating position fluctuation according to an embodiment 1.

FIG. 3A illustrates examples of actual measurement results of the laser beam irradiating position fluctuation which is caused by a reason that it is difficult to predict the correlation with the temperature elevation before the color deviation correcting method is applied and the fluctuation characteristics differ among the colors. This graph illustrates the laser beam irradiating position fluctuation on each color photosensitive drum 12 in the case where a continuous print as a certain single print mode has been executed in a state where the intra-apparatus temperature elevation does not occur. The laser beam irradiating position fluctuation, that is, a deviation according to the temperature change is measured by using a measuring tool. In addition to that fluctuation tendencies in the two laser beams (between Y and M, between C and K) in the same scanner differ largely, a difference can be also detected in fluctuation tendencies between the first scanner 10a (Y, M) and the second scanner 10b (C, K). Since not only the fluctuation amounts but also the fluctuation tendencies themselves differ, it is difficult to predict a relative difference between the laser beam irradiating position fluctuations of the respective colors, that is, the "color deviation" by a linear-like function. The temperature changes in the scanner area are plotted in the graph (illustrated by a solid line in the diagram). In spite of the fact that the temperature change in the scanner area has increased, the laser beam irradiating position fluctuation increases and decreases and it is difficult to find out a correlation between them. It is, therefore, very difficult to correct the color deviation by using the conventional method mentioned in the columns of the related art.

Figure 4:
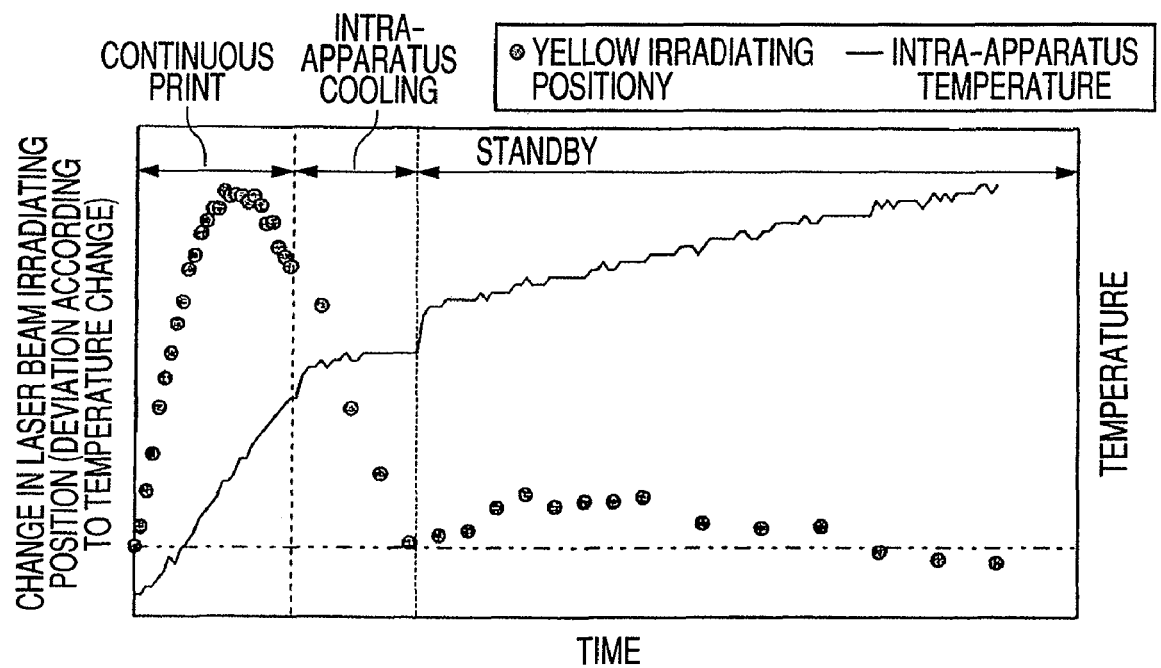
FIG. 4 is a diagram illustrating a change in laser beam irradiating position in a plurality of operating modes of the image forming apparatus according to the embodiment 1.

Another example of actual measurement results is illustrated in FIG. 4. This graph illustrates measurement results of the laser beam irradiating position fluctuation on the photosensitive drum 12Y of yellow and the change in intra-apparatus temperature in the case where after completion of the continuous print, a fan provided in the image forming apparatus is driven, the inside of the apparatus is cooled, and thereafter, the output paper is left in the standby mode. It will be understood that a way of the laser beam irradiating position fluctuation also differs largely according to the operating mode (each operating mode of the continuous print, intra-apparatus cooling, and standby) of the image forming apparatus.

Besides the characteristics illustrated in the examples of FIGS. 3A and 4, the following characteristics which make it difficult to apply the conventional color deviation correcting method have been confirmed.

Even if the output paper has been left in the standby mode, the laser beam irradiating position of each color fluctuates until the intra-apparatus temperature becomes stable.

Between a state where the inside of the apparatus has been cooled and a state where the output paper has been left sufficiently in the standby mode, although there is not a large difference in the atmospheric temperatures in the scanner area, there is a large difference in the laser beam irradiating position fluctuations upon printing.

The fluctuating directions and fluctuation amounts of the laser beam irradiating positions after the start of the printing or after the end of the printing differ depending on an operation history (for example, whether or not the apparatus immediately starts the printing operation or the like) after the turn-on of a power source of the image forming apparatus and do not coincide with increase/decrease amounts of the temperature.

A mechanism for overcoming those factors which make it difficult to predict the laser beam irradiating position fluctuation and for predicting the laser beam irradiating position fluctuation will be specifically described hereinbelow.

<Arithmetic Operation for Predicting Laser Beam Irradiating Position>

The image forming apparatus of the embodiment is characterized in that by the functions of the engine control unit, the deviation amount associated with the aging change of the laser beam irradiating position is obtained by arithmetic operations, the laser beam irradiating position of each color is adjusted based on the deviation amount obtained by the arithmetic operations, and the color deviation is corrected. In the non-volatile storing unit 324 as a parameter storing unit, values of constants to be applied to a function of an arithmetic operation algorithm for predicting the color deviation have been held in a parameter table with respect to the colors of Y, M, C, and K and in correspondence to each operating mode of the image forming apparatus. The numerical values corresponding to the parameters of the arithmetic operation algorithm are applied to the color deviation correction according to the present operating mode.

The operating mode mentioned here denotes an operating state of the image forming apparatus such as standby mode, sleep mode, print-1 mode and print-2 mode for executing the printing operation, and intra-apparatus cooling mode. The print-1 mode denotes a normal print mode using plain paper. The print-2 mode denotes a mode such as thick paper mode or OHT mode for forming an image at a speed lower than a speed in the plain paper print mode. In these cases, since the intra-apparatus temperature elevation tendency of the image forming apparatus differs, a difference occurs in the laser beam irradiating position fluctuation characteristics by its influence. OHT is an abbreviation of Overhead Transparency.

An example of an image of the parameter table is shown in a table as illustrated in FIG. 5. In the diagram, constant parameters of an algorithm function are allocated to parameters a1, a2, b1, and b2, the colors of YMCK are allocated to a station (s), and the foregoing operating modes are allocated to an operating mode (m), respectively. Roles of the parameters a1, a2, b1, and b2 will be described hereinbelow. In the case of the image forming apparatus of the embodiment, the fluctuation amount of the laser beam irradiating position of black (K) is small irrespective of the operating mode (refer to FIG. 3A). Therefore, in the case of black, it is determined that the irradiating position fluctuation does not occur, and a sensitivity parameter of the algorithm function is set to zero, thereby invalidating the arithmetic operation.

The arithmetic operation algorithm of the arithmetic operation which is executed by the CPU 321 as a deviation amount arithmetic operating unit can calculate a prediction value of the color deviation by information of "the operating mode of the image forming apparatus" necessary to decide the "operating time" and the numerical value of the parameter. It is assumed that the station is set to s, the operating mode is set to m, and the operating time after the operating mode was switched is set to t. The algorithm function is expressed by the following expression (1).

$$F_{[s,m]}(t) \tag{1}$$

The contents in [ ] in the expression (1) indicate information for selecting the parameter and the contents in ( ) indicate an input variable.

<Detailed Description of Arithmetic Operation (Algorithm)>

A design idea and a schematic construction of the algorithm used in the embodiment will be briefly described. It is presumed that so long as the laser beam irradiating position fluctuation has been caused by the temperature change, even if the correlation with the actual temperature change cannot be found out, it can be expressed by an algorithm based on a temperature phenomenon. In the image forming apparatus of the embodiment, assuming that the optical unit is complicatedly deformed by a relative difference of the temperature changes at a plurality of points in the apparatus and it causes the laser beam irradiating position fluctuation, the laser beam irradiating position fluctuation characteristics illustrated in FIG. 3A can be also approximated and expressed.

Now, specifically describing, the algorithm function in the embodiment is formed as follows. That is, it can be noted that the examples of the actual measurement results illustrated in FIG. 3A have characteristics which fluctuate so as to draw an S-curved characteristic. If it is presumed that the laser beam irradiating position fluctuation is caused due to a relative temperature difference at two virtual points, and the algorithm function is formed. The two virtual points will now be described in detail. The virtual point can be interpreted as a thermal influence which causes the color deviation. First, as specific examples of the heat sources, elements such as polygon motor and laser substrate which generate heat in association with the operation of the image forming apparatus. The virtual point can be also interpreted as a virtual/pseudo heat source which integratedly expresses the influences of a plurality of specific heat sources mentioned now with respect to the portion of the laser scanner where a thermal deformation which becomes a factor of the laser beam irradiating position fluctuation occurs. For example, when the polygon motor starts to rotate, a temperature of a portion near the polygon motor of a frame which forms the laser scanner rises suddenly and is converged in a short time. On the other hand, a temperature of a portion away from the polygon motor rises gradually and is converged while taking a long time. At this time, the thermal deformation of each portion has different influence characteristics to the laser beam irradiating position. A phenomenon similar to that mentioned above is also observed with respect to other specific heat sources. That is, a phenomenon of the different influence characteristics to the laser beam irradiating position in which those specific heat sources have integratedly been considered is approximated by the two presumed virtual points.

As mentioned above, the two virtual points can be interpreted as a first thermal influence and a second thermal influence. The laser beam irradiating position fluctuation is caused by a degree of the temperature change of each of the first thermal influence and the second thermal influence. Results obtained by modeling the temperature changes in those two thermal influences are illustrated in FIG. 3C.

Figure 3B:
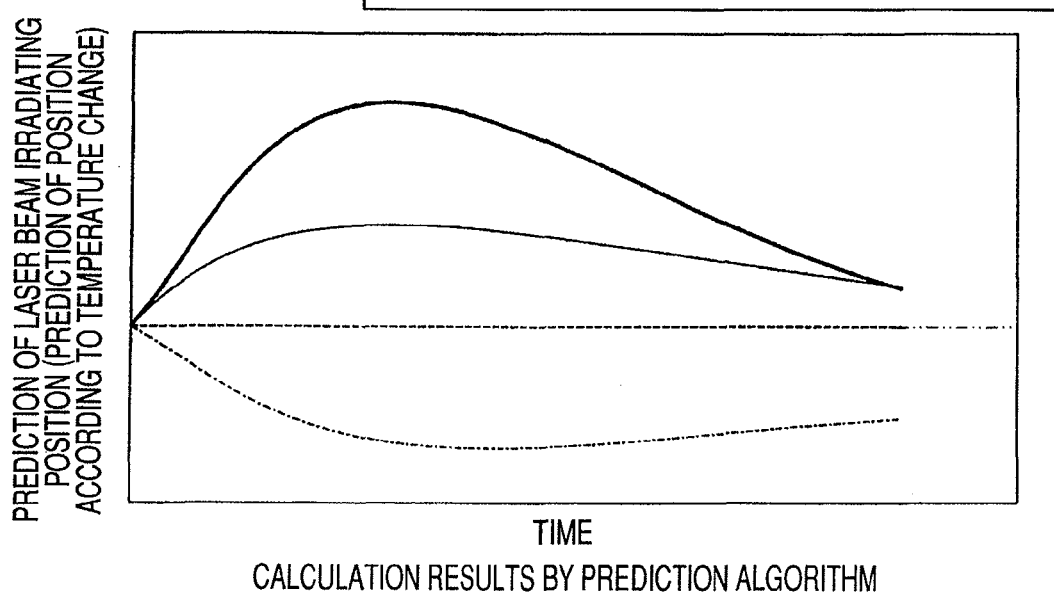
FIG. 3B is a diagram illustrating calculation results by a prediction algorithm according to the embodiment 1.
Figure 3C:
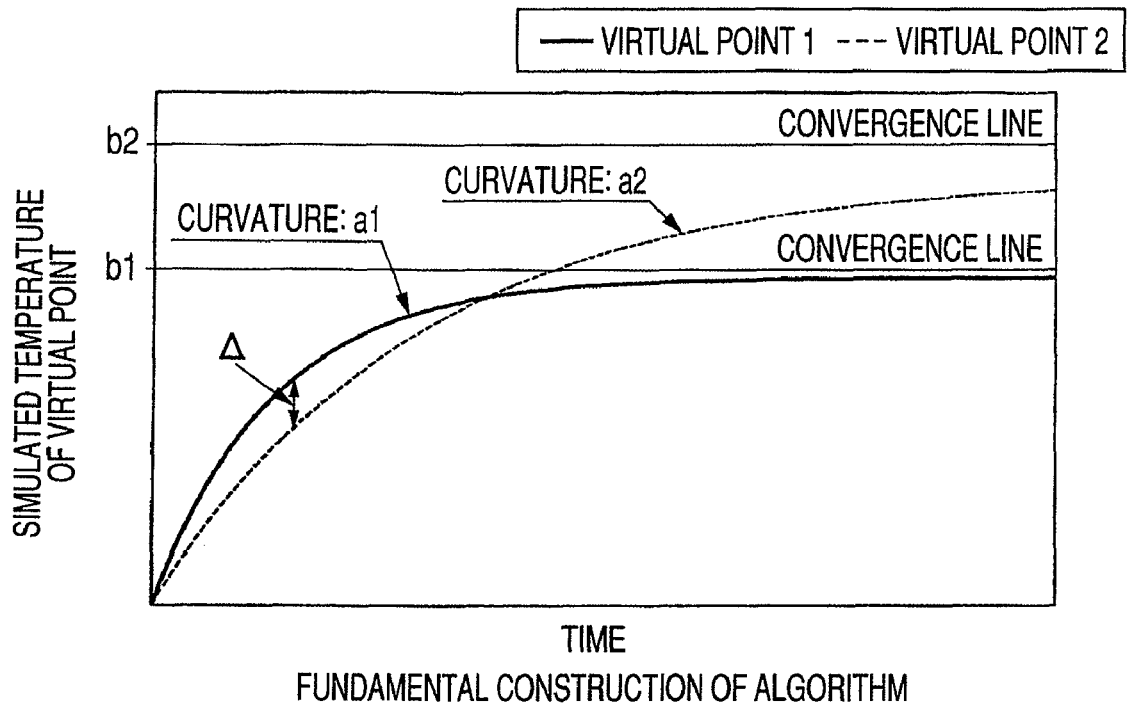
FIG. 3C is a diagram illustrating a fundamental construction of the algorithm according to the embodiment 1.

FIG. 3C illustrates specific examples of the temperature changes at the respective virtual points (first thermal influence, second thermal influence) and illustrates a fundamental construction of the algorithm. A virtual point-1 presumes a thermal influence in which the temperature rises suddenly and is converged in a short time. A virtual point-2 presumes a thermal influence in which the temperature rises gradually and is converged while taking a long time. As shown in the actual measurement results illustrated in FIG. 3A, now assuming that to the fluctuation characteristics which are converged along an S-curved characteristic, the temperature change at each of the virtual point-1 and the temperature change at the virtual point-2 has an action adapted to deviate the laser beam irradiating position in the opposite direction, the phenomenon of the graph can be approximated. A value of a difference ($\Delta$ in the diagram) obtained by multiplying the temperatures at both of the virtual points by a predetermined coefficient based on it is set to a prediction amount of the laser beam irradiating position fluctuation, thereby approximating the foregoing S-curved fluctuation characteristics serving as a fundamental form. Therefore, in FIG. 3C, the direction of the laser beam irradiating position fluctuation in the case where a curve having a curvature of a1 is located over a curve having a curvature of a2 and the direction of the laser beam irradiating position fluctuation in the case where the curve of the curvature a2 is located over the curve of the curvature a1 are opposite. As mentioned above, fundamental arithmetic operation expressions of those algorithms are common for the respective stations and the respective operating modes. The values of the parameters to be used are properly selected from the non-volatile storing unit 324.

Further, as illustrated in a parameter table in FIG. 5, in the algorithm function formed in the embodiment, the constant parameters a1, a2, b1, and b2 to be switched every station and every operating mode are set. Among those parameters, a1 and a2 are parameters to decide a degree of the temperature change (curvature of a curve which is drawn) with respect to the two virtual points which are simulated by the expression (1). The constant parameters b1 and b2 are parameters to decide a value to which the temperature at each virtual point should be converged in the case where the same operating mode has been continued for an infinite time.

The position fluctuation characteristic having S-curved characteristic can be predicted every station (color) and every operating mode by the above-described algorithm (arithmetic operating expression). That is, the deviation amount of the laser beam irradiating position increases gradually every operating mode by the influence of the heat in the apparatus. By the further aging change, the deviation amount of the laser beam irradiating position decreases gradually. The position fluctuation characteristics in which the deviation amount of the laser beam irradiating position is converged by the further aging change can be predicted.

When the laser beam irradiating position fluctuation illustrated as an example in FIG. 3A is presumed by using the arithmetic operation which is executed by the CPU 321 of the engine control unit in the embodiment, it is as illustrated in the graph of FIG. 3B. A curve illustrated in this graph is obtained by plotting the calculation result of the expression (1) of the foregoing algorithm function and shows the laser beam irradiating position prediction (position prediction according to the temperature change). It will be understood a correspondence to the actual measurement results (FIG. 3A) is obtained.

The example in which the prediction amount of the laser beam irradiating position fluctuation is obtained by approximating the foregoing S-curved fluctuation characteristics serving as a fundamental form has been described. However, for example, in the intra-apparatus cooling mode in FIG. 11B, which will be described hereinafter, the operating mode is shifted to the standby mode before the S-curved characteristic is actually drawn. Therefore, a change in S-curved characteristic cannot be read out of the diagram. However, if the intra-apparatus cooling mode is continued, the S-curved characteristic of laser beam irradiating position fluctuation is drawn as described above.

<Prediction of Color Deviation Amount>

Figure 6A:
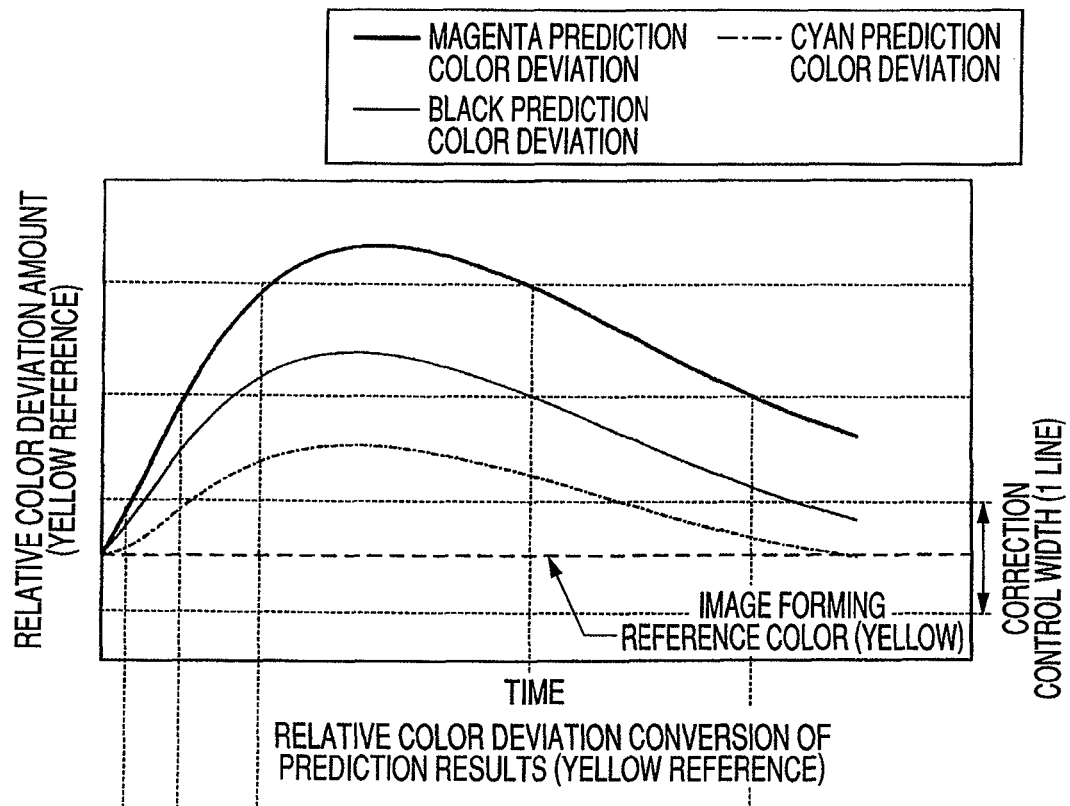
FIG. 6A is a diagram illustrating a relative color deviation conversion (Yellow reference) of prediction results according to the embodiment 1.
Figure 6B:
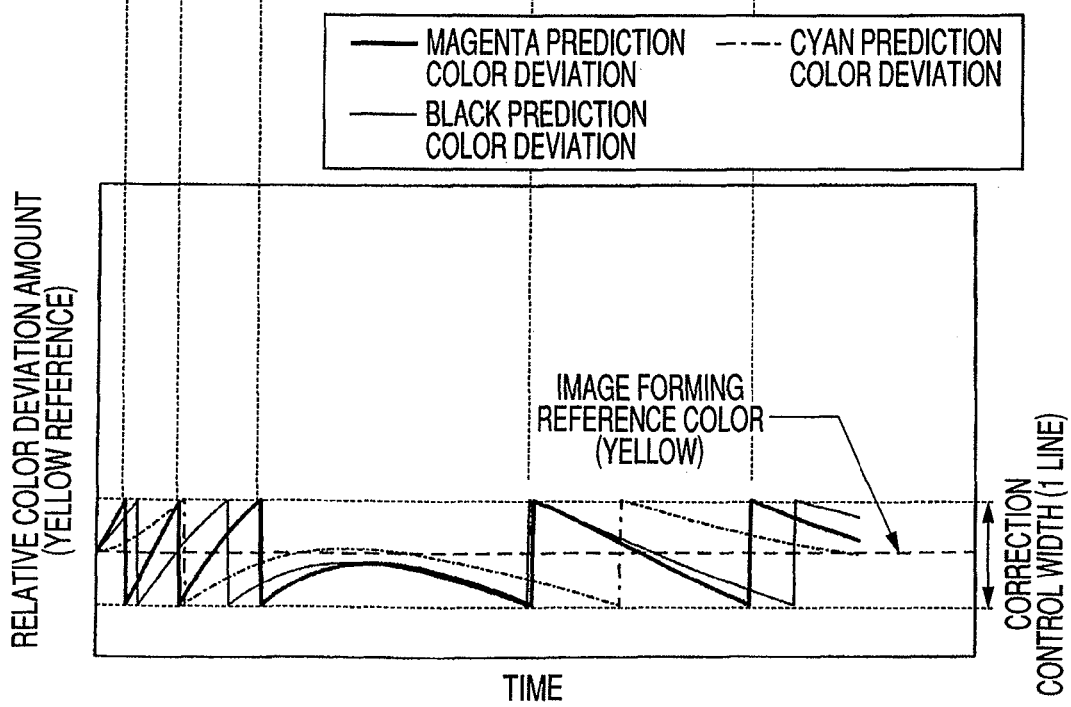
FIG. 6B is a diagram illustrating an outline of a method of correction control based on a prediction according to the embodiment 1.

The engine control unit calculates a relative color deviation amounts of an image forming reference color (yellow in the embodiment) and other colors from the prediction results calculated from the algorithm function of the color deviation prediction. When the prediction results of the laser beam irradiating position fluctuation illustrated in FIG. 3B is converted into the color deviation of the yellow reference, it is as illustrated in FIG. 6A. FIG. 6A illustrates each prediction color deviation to the reference color yellow. In the diagram, a prediction color deviation of magenta is illustrated by a bold solid line, a prediction color deviation of cyan is illustrated by an alternate long and short dash line, and a prediction color deviation of black is illustrated by a thin solid line. The relative color deviation amount of each color to the reference color yellow is calculated based on the following calculations.

Relative Color Deviation Amount:

$$F_{[Y,m]}(t) - F_{[s,m]}(t) \qquad \text{Expression (2)}$$

The relative color deviation amount of each color to the reference color yellow is as follows.

Magenta: $F_{[Y,m]}(t) - F_{[M,m]}(t)$
Cyan: $F_{[Y,m]}(t) - F_{[C,m]}(t)$
Black: $F_{[Y,m]}(t) - F_{[K,m]}(t)$ The laser irradiating timing is controlled so that the relative color deviation amount is equal to a predetermined deviation amount or less. In the image forming apparatus of the embodiment, the control is made in such a manner that when the minimum unit of the laser beam irradiating position adjustment is defined to be one line, the positions of other colors to the image forming reference color lie within a range of ±0.5 line upon prediction. Correction results in the case where the laser irradiating timing control by the color deviation correction control is applied to the color deviation fluctuation as illustrated in FIG. 6A are illustrated as an outline of the method of the correction control based on the prediction in FIG. 6B. For example, time when a laser irradiating timing shift of magenta (illustrated by the bold solid line) is performed is illustrated by the broken line in FIGS. 6A and 6B. The timing shift denotes that the laser irradiating timing is shifted in order to correct. With respect to cyan (illustrated by the alternate long and short dash line) and black (illustrated by the thin solid line), the laser irradiating timing shift is independently performed every color.

<Flowchart for Color Deviation Correction>

Figure 7:
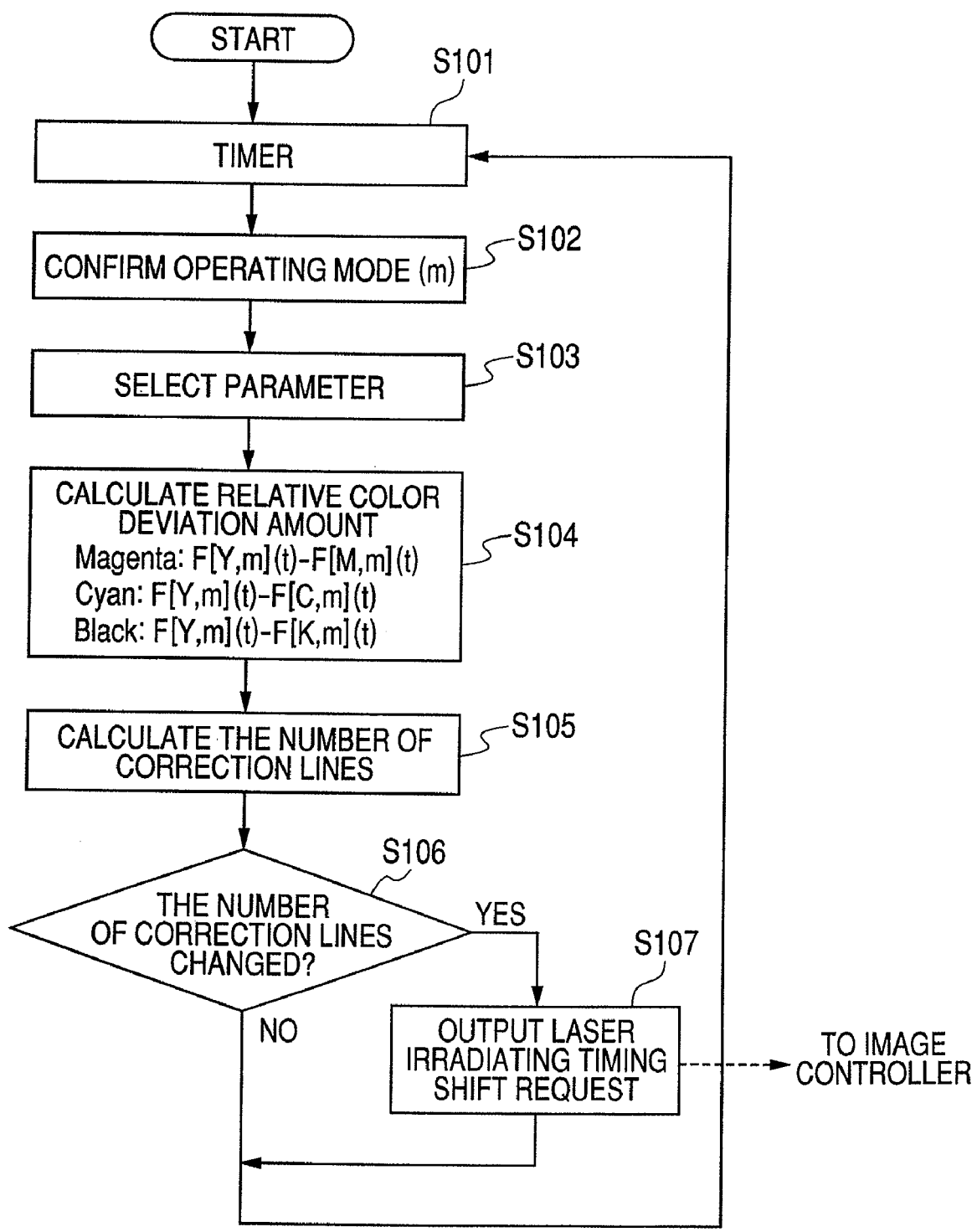
FIG. 7 is a flowchart for describing an outline of the color deviation correction control based on the invention.

The color deviation correction control which is used in the embodiment will be described in detail with reference to a flowchart for the control process illustrated in FIG. 7. The processes in this flowchart are executed by the engine control unit in FIG. 2.

The arithmetic operation regarding the color deviation prediction is executed at predetermined time intervals by a timer (step 101, hereinbelow, referred to as S101: this is true of FIG. 7). That is, the arithmetic operation is executed without interrupting the printing operation (image forming operation) of a print job. A use efficiency of the user is extremely improved. To prevent the printing operation (image forming operation) of the print job from being interrupted, the arithmetic operation regarding the color deviation prediction may be executed page by page in the printing operation.

First, the CPU 321 checks (confirms) the present operating mode m of the image forming apparatus in S102. The corresponding parameter values are applied from the parameter table stored in the non-volatile storing unit 324 to the algorithm function (expression (1)). For example, as illustrated in FIG. 4, a case where after completion of the continuous print (assumed to be the printing in the print-1 mode), the intra-apparatus cooling operation for driving the cooling fan provided for the image forming apparatus for a predetermined time is executed and, thereafter, the operating mode is shifted to the standby mode is presumed. In this case, with respect to the parameter table illustrated in FIG. 5, the parameters are switched as follows. First, since the operating mode is "print-1" of m=4 during the printing, the parameters in a portion illustrated by A in the diagram are applied to the algorithm. When the intra-apparatus cooling operation is executed after the printing, the operating mode is "intra-apparatus cooling" of m=3 and the parameters in B in the diagram are applied to the algorithm. Similarly, after the operating mode was shifted to the standby mode, the operating mode is set to "standby" of m=1 and the parameters in C in the diagram are applied to the algorithm. Since the algorithm function (expression (1)) has a construction in which when the operating mode m is switched, the history of the arithmetic operation result in the previous operating mode is succeeded and the subsequent calculation is executed, the fluctuation as illustrated in FIG. 4 can be also predicted.

The parameters according to the operating mode are applied to the algorithm function and the color deviation amount is obtained by the arithmetic operation (S103). Subsequently, the relative color deviation amount (expression (2)) of each color to the reference color yellow is calculated (S104). How many lines should be corrected for each color in order to make the proper color deviation correction is calculated from a calculation result (S105). The number of lines is calculated from a difference between a prediction value of the relative color deviation amount at a point of time when a calibration for adjusting the color deviation has finally been executed and the color deviation has been cancelled (reduced) and a prediction value of the present relative color deviation amount.

As a result of the calculation, if there is a change in number of correction lines (YES in S106), the video controller 200 is requested to shift the writing timing for the image data of the relevant color (S107). For example, if the correction amount of cyan which was equal to +5 lines is changed to +4 lines as a calculation result, the video controller 200 is requested to change the correction amount of cyan to +4 lines. The video controller 200 which received the shift request applies the timing shift from the head of the print image of the next page. If there is no change in the number of correction lines in S106, the processing routine is returned to the process of S101.

<Color Deviation Correction Result and Presumption Cumulative Color Deviation Amount>

Figure 8A:
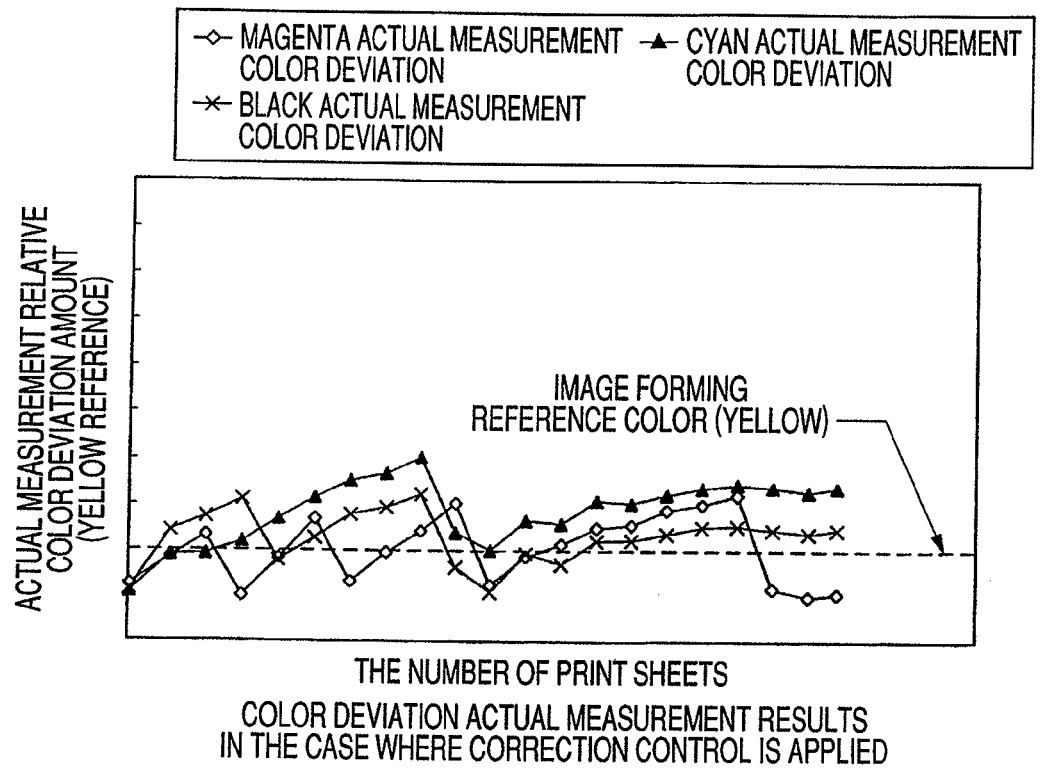
FIG. 8A is a diagram illustrating actual measurement results of the color deviations when the correction control according to the embodiment 1 is applied.
Figure 8B:
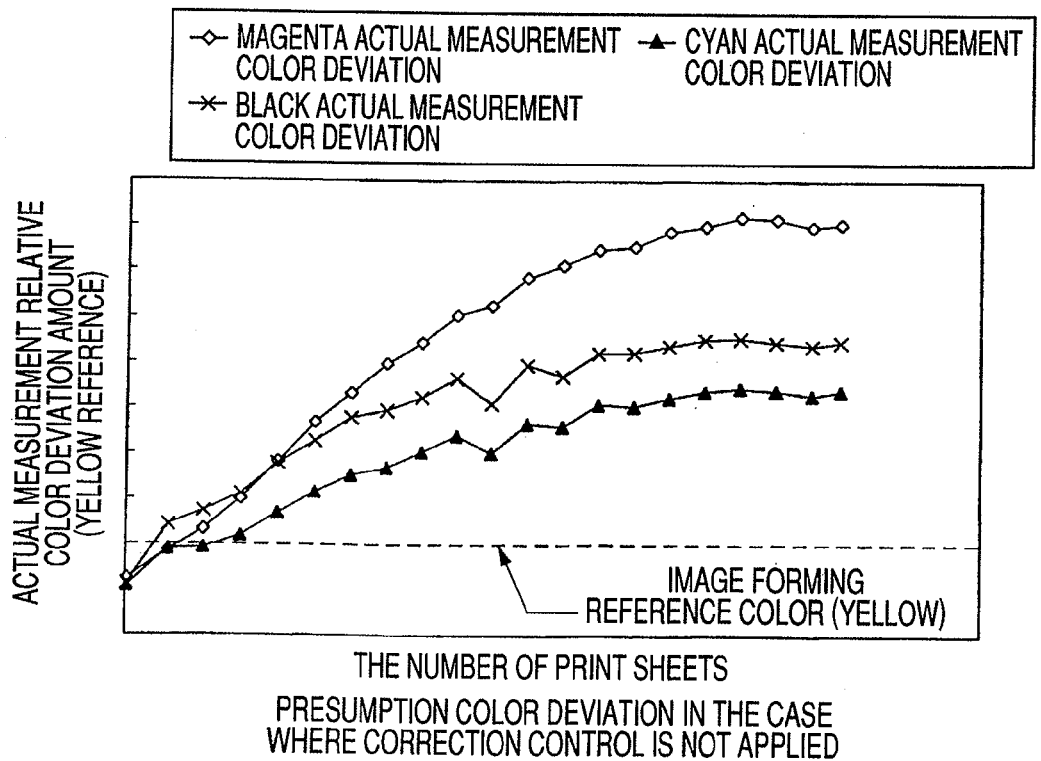
FIG. 8B is a diagram illustrating presumption color deviations when the correction control according to the embodiment 1 is not applied.

An example of results obtained by actually applying the color deviation correction based on the invention is illustrated in FIG. 8A as a color deviation actual measurement results when applying the correction control. It is a result obtained by executing the continuous print in a certain print mode, extracting every predetermined number of output paper, and performing a color deviation analysis. When a color deviation shift in the case where the correction control is not made is presumed from a control history, it is as illustrated in FIG. 8B as a presumed color deviation in the case where the correction control is not applied. Therefore, according to the invention, it will be understood that the good correction has been made.

As mentioned above, by using the invention, with respect to the color deviation which is caused by the laser beam irradiating position fluctuation, the color deviation prediction and the color deviation correction can be generally realized irrespective of the presence or absence of the correlation between the intra-apparatus temperature and the color deviation fluctuation tendency. Thus, the high quality image creation with little color deviation can be realized.

An algorithm which has been optimized based on measurement data at the time of development of a product is used, the operating mode of the image forming apparatus is used as a parameter, the operating time is used as input information, and the color deviation is predicted. Thus, even in the case where it is difficult to find out the correlation between the change in intra-apparatus temperature and the color deviation fluctuation tendency, the color deviation fluctuation can be predicted.

The values of the parameters which are applied to the algorithm are individually set every station (color) and every operating mode, so that it is also possible to flexibly cope with the complicated thermal shift characteristics.

As mentioned above, it can be said that the color deviation correcting method of the invention is an effective color deviation correcting method having high generality which can flexibly cope with a difference of the construction of the image forming apparatus.

An embodiment 2 will be described hereinbelow. Although the "operating time" is used as an input variable for the arithmetic operation algorithm function (expression (1)) of the arithmetic operation which is executed in the CPU 321 in the engine control unit in the embodiment 1, the invention is not limited to it. If such a disturbance factor as to exert an influence on the color deviation phenomenon exists, the disturbance is detected by a sensor or the like for evaluating a degree of influence of the disturbance and a detection result can be also reflected as a further variable. A specific example of such a case will be described in the embodiment 2.

Figure 9:
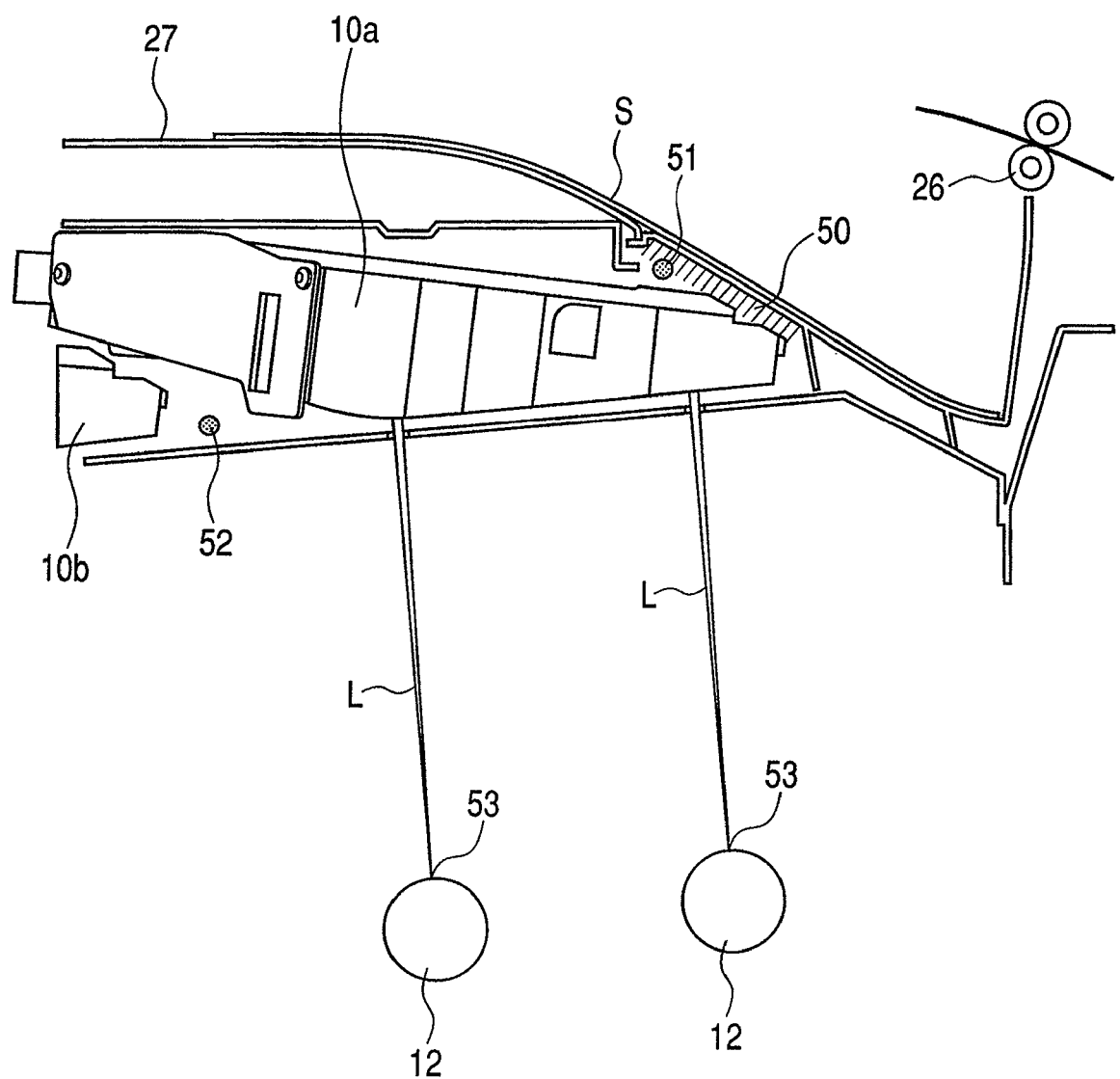
FIG. 9 is a cross sectional view for describing a layout of temperature sensors according to an embodiment 2.

In the image forming apparatus illustrated in FIG. 1, in order to realize a compact size of the product and to assure a large amount of sheets which are stacked onto the discharge tray 27 (discharge unit), a layout in which the first scanner 10a and the back surface of the discharge tray 27 are closely arranged (proximity area 50, refer to FIG. 9) is often used. FIG. 9 is a cross sectional view for describing a layout of temperature sensors, which will be described hereinafter. According to such a layout, the first scanner 10a is liable to be subjected to a thermal influence of sheets S which have been ejected and stacked onto the discharge tray 27. A degree of such a thermal influence acts on fluctuations of the laser beam irradiating positions 53 of yellow and magenta of the first scanner 10a. With respect to cyan and black, since the second scanner 10b is sufficiently away from the discharge tray 27, it is not influenced.

Figure 10A:
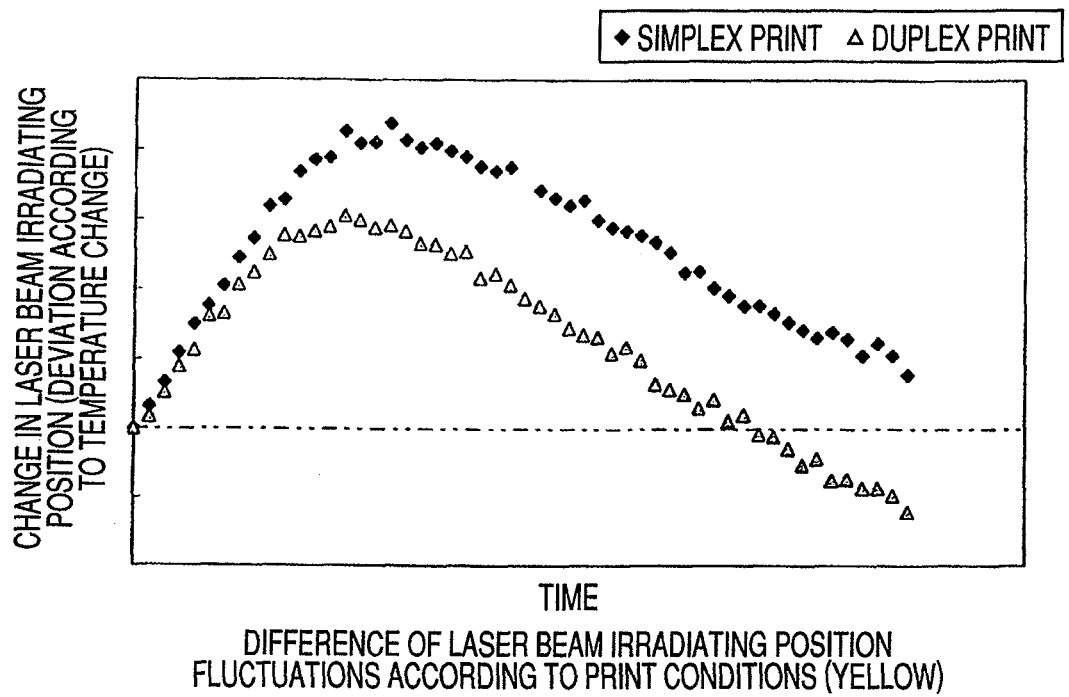
FIG. 10A is a diagram illustrating a difference of laser beam irradiating position fluctuations (Yellow) based on print conditions according to the embodiment 2.

In the image forming apparatus of the embodiment, a specific example is illustrated with respect to the laser beam irradiating position fluctuation of yellow which is most liable to be influenced. FIG. 10A is a graph illustrating a comparison between the irradiating position fluctuation in the simplex continuous print and the irradiating position fluctuation in the duplex continuous print and is a diagram illustrating a difference of the laser beam irradiating position fluctuations according to the print conditions with respect to yellow. Since an interval between the sheets which are output onto the discharge tray 27 in the duplex print mode is widened to a value which is twice as large as an interval in the simplex print mode, a heat amount held in a bundle of output paper decreases. Such a difference between the heat amounts appears as a difference of the fluctuation amounts of the laser beam irradiating positions.

Figure 11A:
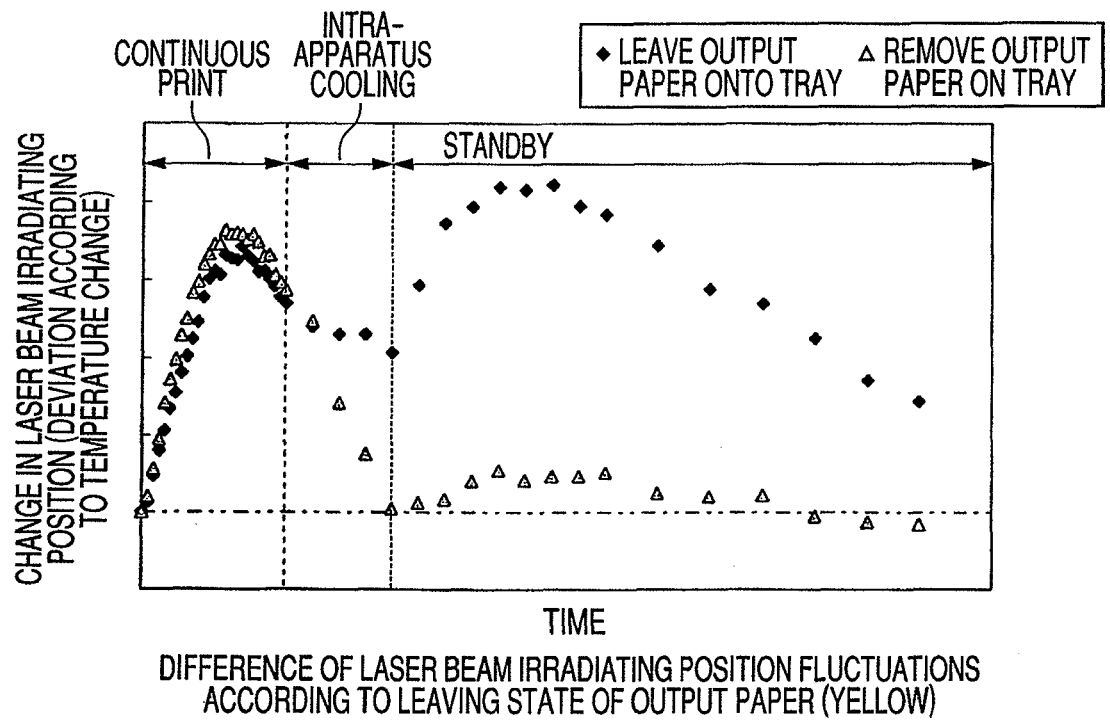
FIG. 11A is a diagram illustrating a difference of laser beam irradiating position fluctuations (Yellow) based on an output paper leaving state according to the embodiment 2.

FIG. 11A illustrates a comparison between the laser beam irradiating position fluctuation in the case where the output paper has been left on the discharge tray 27 after the continuous print was executed in a certain print mode and the laser beam irradiating position fluctuation in the case where the output paper has been removed from the discharge tray 27 simultaneously with the end of the job. It will be understood from the comparison between them that a large difference has occurred in the laser beam irradiating position fluctuations after the end of the job.

In order to realize the precise color deviation correction control in correspondence to the disturbance factor called a sheet heat on the discharge tray 27, in the image forming apparatus of the embodiment, an influence degree of the heat which is subjected from the sheets S on the discharge tray 27 is detected by a temperature sensor. Information of the heat influence degree detected by the temperature sensor is fed back to the arithmetic operation algorithm of the CPU 321 in the engine control unit for the color deviation correction. Unlike the conventional color deviation correcting method mentioned in the columns of the related art, according to the embodiment, the correction amount is not decided according to the temperature detected by the temperature sensor but the influence degree of the disturbance is applied as a variable which is used for a sensitivity adjustment of the constant parameter to the function of the arithmetic operation algorithm. That is, even if there is no input of the temperature information, the CPU 321 executes the prediction arithmetic operation and can output a result. A construction of the embodiment will be described hereinbelow.

First, a layout of two temperature sensors (a plurality of environment detecting units, a plurality of temperature detecting units) will be described. As illustrated in a cross section in FIG. 9, a first temperature sensor 51 is arranged near the proximity area 50 of the discharge tray 27 and the first scanner 10a and a second temperature sensor 52 is arranged at a position away from the proximity area 50. The first temperature sensor 51 detects an ambient temperature of the proximity area 50 (hatched portion in the diagram). The second temperature sensor 52 detects an average atmosphere temperature of a space in which the first scanner 10a and the second scanner 10b are arranged.

Figure 12:
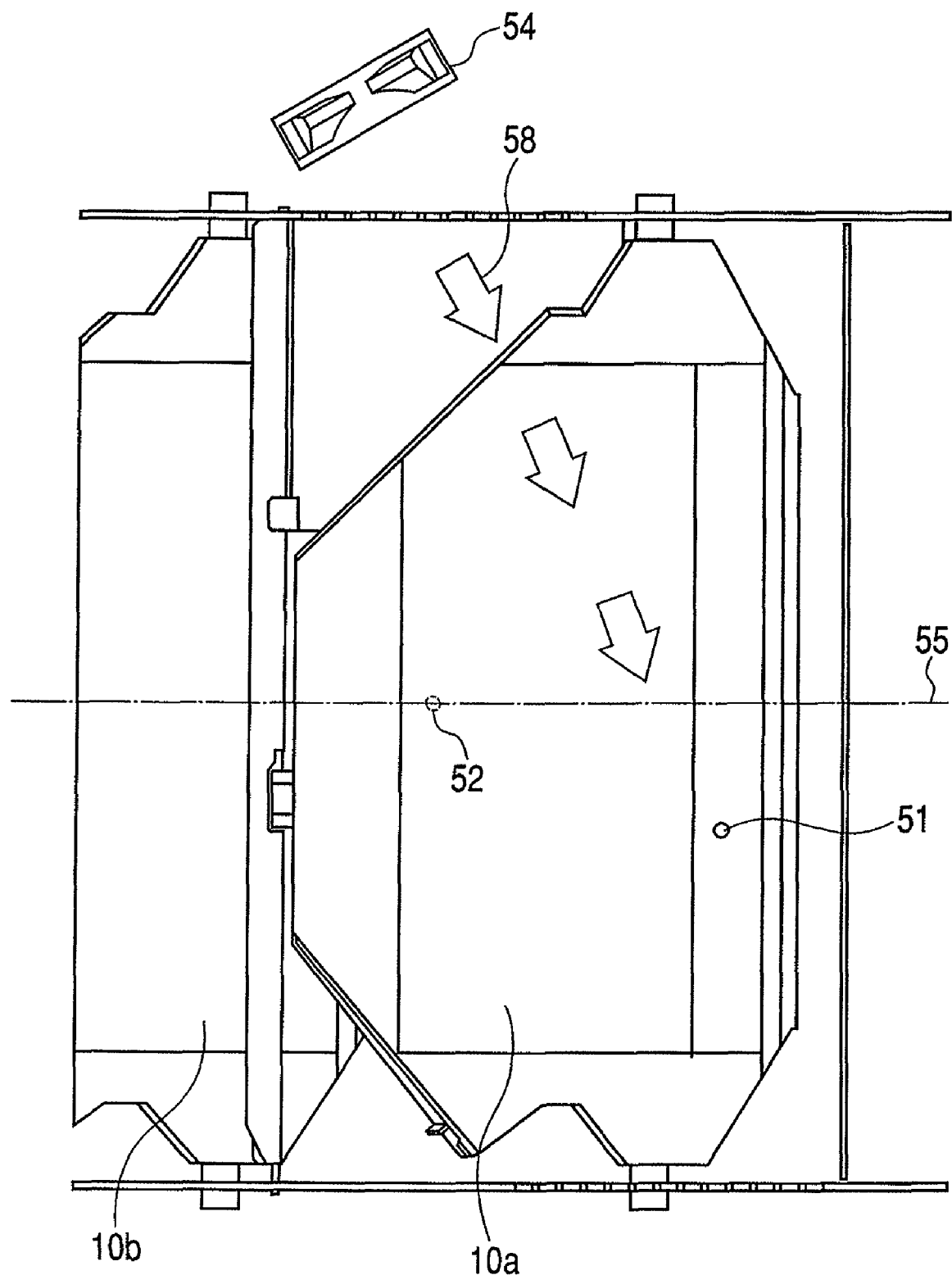
FIG. 12 is an explanatory diagram of a layout of temperature sensors in the embodiment 2 when seen from the top.
Figure 13A:
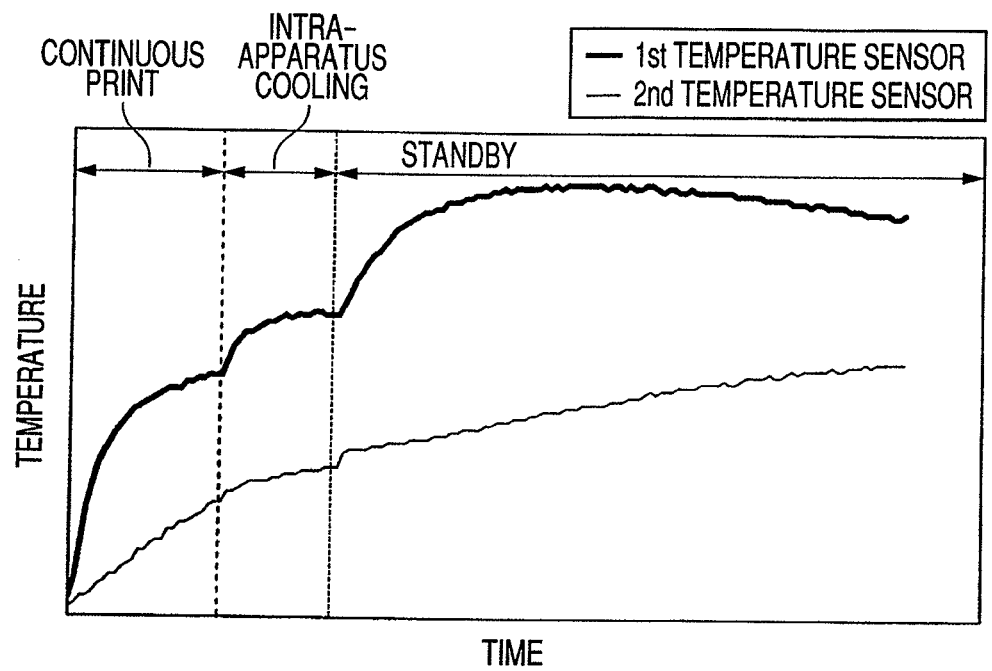
FIG. 13A is a diagram illustrating temperature changes in the case where output paper has been left on a tray according to the embodiment 2.
Figure 13B:
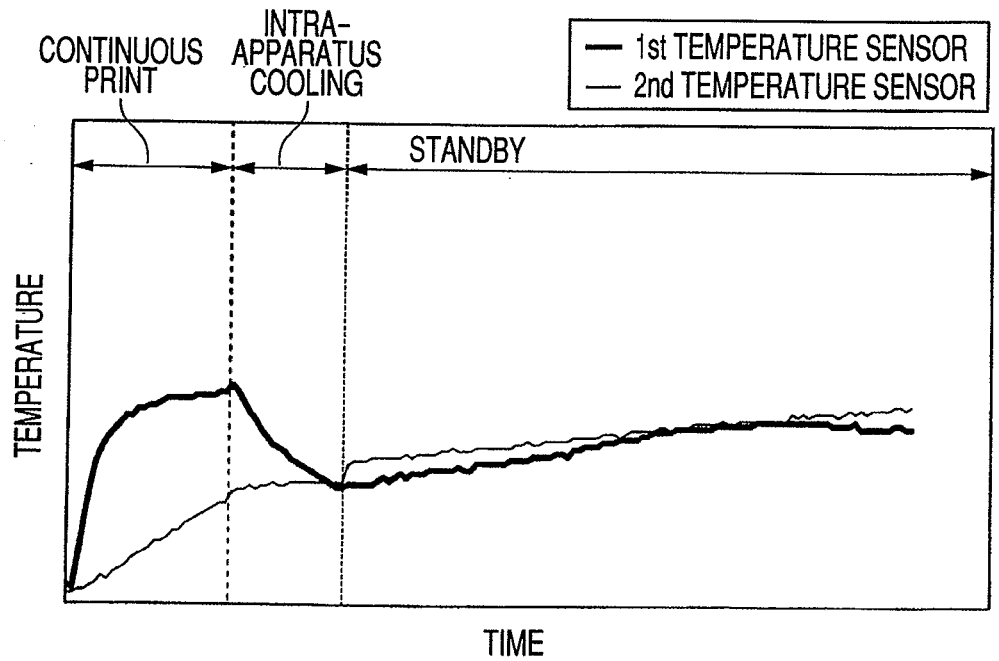
FIG. 13B is a diagram illustrating temperature changes in the case where the output paper on the tray has been removed according to the embodiment 2.

As illustrated in a top view in FIG. 12, in order to lighten (reduce) the thermal influence from the discharge tray 27, an air flow 58 (flow of air) for heat insulation is provided in the space in which the first scanner 10a and the second scanner 10b are arranged, that is, it is arranged between the first scanner 10a and the discharge tray 27. The first temperature sensor 51 is arranged on the downstream side of the air flow 58 to a center 55 in the width direction of the sheet stacking area on the discharge tray 27 (direction perpendicular to the sheet moving direction). The heat insulating air sent to a scanner area by a cooling fan 54 (fan) on the rear side of the apparatus main body flows almost in parallel with the image width direction along the back surface of the discharge tray 27 for a time interval until the air reaches the first temperature sensor 51. In this instance, a heat amount which the heat insulating air receives from the discharge tray 27 changes according to the size of sheets which are stacked onto the discharge tray 27 and their stacking state and a difference occurs in the detection temperature of the first temperature sensor 51. For example, outputs of the first temperature sensor 51 and the second temperature sensor 52 under the measuring conditions in FIG. 11A are illustrated in FIGS. 13A and 13B. FIG. 13A illustrates a result in the case where the output paper has been left on the discharge tray 27 and FIG. 13B illustrates a result in the case where the output paper has been removed.

The detection temperature of the second temperature sensor 52 is an average atmosphere temperature of the scanner area including the intra-apparatus temperature elevation component of the image forming apparatus. On the other hand, it can be said that the detection temperature of the first temperature sensor 51 is a temperature in which the thermal influence that is subjected from the discharge tray 27 is added to the atmosphere temperature of the scanner area. That is, if only the detection temperature of the first temperature sensor 51 is monitored, it rises more and more. However, by monitoring the detection temperatures of both of the first temperature sensor 51 and the second temperature sensor 52, the following point can be found out. In other words, by obtaining a difference between the two detection results, the temperature increase of only the first temperature sensor 51 is known and, thereafter, a fact that the temperature becomes the same temperature of the second temperature sensor 52 can be monitored. Therefore, by obtaining a temperature difference between them, the degree of the thermal influence that the first scanner 10a is subjected from the discharge tray 27 can be extracted. The temperature difference between both of the temperature sensors is defined as dT.

As mentioned above, the heat information of the discharge tray 27 extracted as a temperature difference between the two temperature sensors is fed back to the arithmetic operation algorithm for the color deviation prediction which is executed by the CPU 321 only for the two colors of yellow and magenta which are influenced.

The function of the arithmetic operation algorithm is expressed by the following expression (3).

$$F_{[s,m]}(t, dT) \tag{3}$$

A feedback method of dT in the embodiment will be described with respect to the laser beam irradiating position fluctuations of yellow in the simplex/duplex print modes illustrated in FIG. 10A as an example. As described in the embodiment 1 by referring to FIG. 3C, the algorithm in the embodiment uses such a model in which the irradiating position fluctuation is caused by the temperature difference between the two virtual points. In the embodiment 2, between the two virtual points, a value of the convergent value parameter b1 at the virtual point-1 is adjusted according to the detected dT, thereby allowing a curvature of a curve which is drawn by the algorithm function (expression (3)) to be changed in a real-time manner. Specifically speaking, in the case of the algorithm of yellow during the printing, a value of dT is restricted to a range of 0 to 10☐ (normal fluctuation range) and, subsequently, a value obtained by multiplying b1 by (1*0.9*dT/10) is set to the convergent value at the virtual point-1. A value of 0.9 in this expression is a value which is individually set every color and every operating mode. In the embodiment 2, such a value has been stored as one of the parameters into the parameter table illustrated as an example in FIG. 5.

Figure 10B:
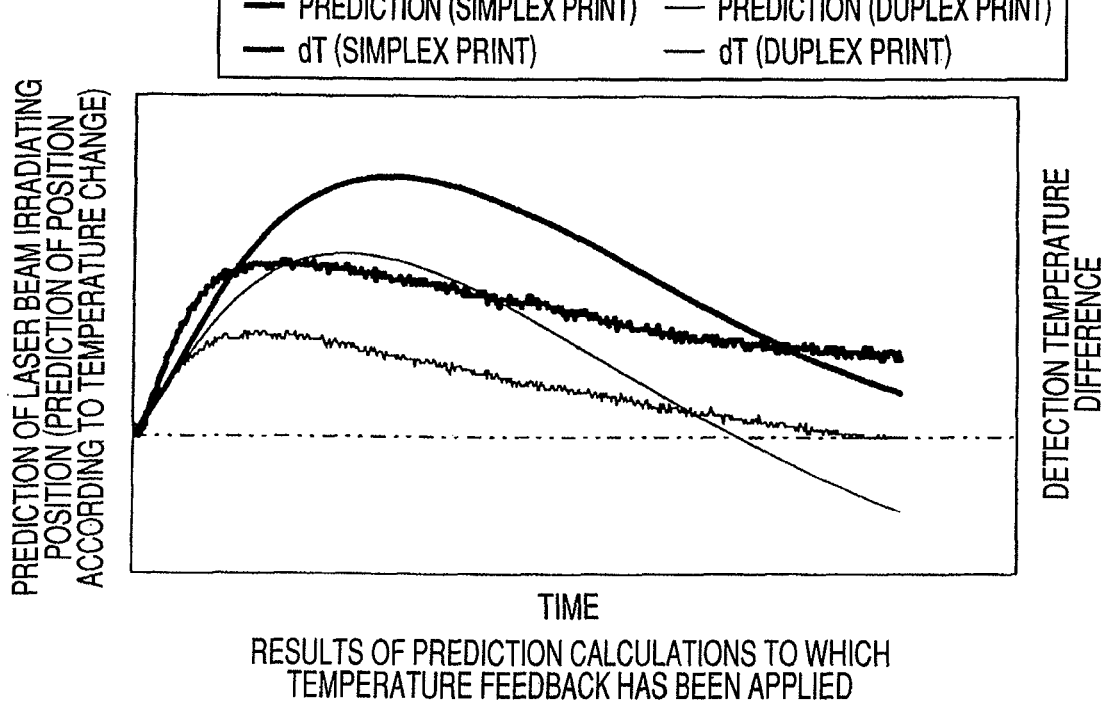
FIG. 10B is a diagram illustrating results of prediction calculations to which a temperature feedback has been applied according to the embodiment 2.

The change in dT upon printing showing the laser beam irradiating position fluctuation in FIG. 10A is as shown in the temperature difference graph of FIG. 10B illustrating the prediction arithmetic operation result to which the temperature feedback is applied. Since the dT in the simplex print mode (bold solid line) changes by a value larger than that in the duplex print mode (thin solid line), the temperature convergent value (b1) at the virtual point-1 which is virtualized by the algorithm is also set to a high value as already mentioned above. Thus, a change in laser beam irradiating position prediction value in the simplex print mode shows a fluctuation tendency which is deviated to the plus side as illustrated in FIG. 10B. The prediction corresponding to the actual measurement results illustrated in FIG. 10A is performed.

Figure 11B:
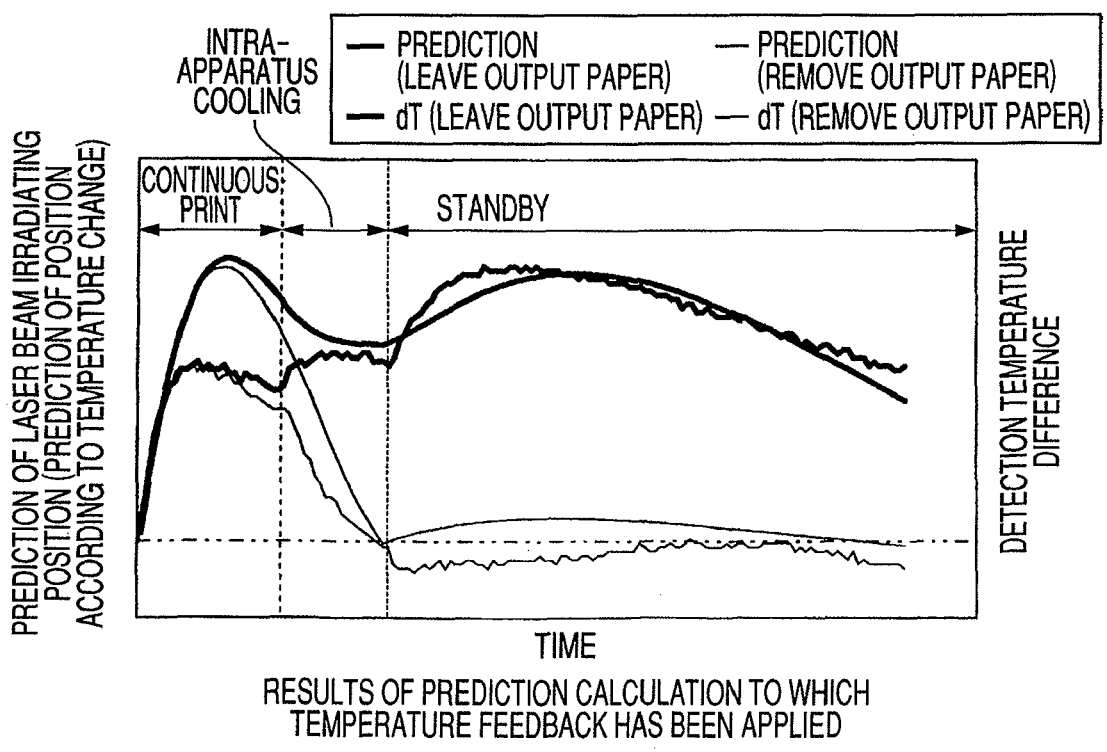
FIG. 11B is a diagram illustrating results of prediction calculations to which the temperature feedback has been applied according to the embodiment 2.

When the laser beam irradiating position fluctuation is similarly predicted by the arithmetic operation according to the color deviation prediction in the embodiment with respect to an example of the laser beam irradiating position fluctuation illustrated in FIG. 11A, results as illustrated in FIG. 11B are obtained (as mentioned above, dT shown in the graph is a temperature difference between the first temperature sensor and the second temperature sensor). FIG. 11B is a graph illustrating the prediction arithmetic operation results to which the temperature feedback is applied. As mentioned above, since the value of dT which is detected by the sensor is reflected to the algorithm function (expression (3)) in a real-time manner, a curvature of the laser beam irradiating position prediction graph changes according to the change in dT and such a difference appears in the arithmetic operation results. A bold solid line indicates the case where the output paper has been left and a thin solid line indicates the case where the output paper has been removed. It will be understood that the prediction results by the arithmetic operation of the CPU 321 precisely correspond to the actual laser beam irradiating position fluctuation as mentioned above. Since the color deviation correction control which is executed by the engine control unit is similar to that in the embodiment 1, its description is omitted here.

According to the embodiment as mentioned above, the values of the parameters which are applied to the algorithm are individually set every color and every operating mode and the function of algorithm is set to a function of the time and the dT as heat information of the discharge tray 27, so that it is possible to flexibly cope with the complicated thermal shift characteristics. That is, if the heat sources existing in and out of the image forming apparatus exert influences as a disturbance on the laser beam irradiating position fluctuation of a specific color, its thermal influence degree is detected by the sensor and is fed back as dT to the color deviation prediction algorithm of the relevant color, so that it is possible cope with such a case.

An embodiment 3 will now be described hereinbelow. In the embodiment 1, fundamental arithmetic operation expression (expression (1)) of those algorithms are common for the respective stations and the respective operating modes. The values of the parameters to be used are properly selected from the non-volatile storing unit 324. However, the invention is not limited to it.

In the embodiment, for example, at the time of the intra-apparatus cooling, another arithmetic operation expression different from the arithmetic operation expression in the continuous print or the standby mode is used. As another arithmetic operation expression, for example, a linear function of the operating time t whose inclination becomes negative at the time of the intra-apparatus cooling is used.

As mentioned above, it is sufficient that the invention has such a construction that the above expression (1) is used in at least one of the plurality of operating modes and another arithmetic operation expression is used in another mode. In other words, the invention is effective in the case where in at least one operating mode, it is difficult to predict a correlation between the fluctuation increase or decrease in the laser beam irradiating position and the temperature increase or decrease.

Also in the embodiment, even in the case where it is difficult to find out a correlation between the optical unit and its peripheral temperature change, the laser beam irradiating position fluctuation can be predicted and the high image quality can be maintained.

An embodiment 4 will now be described hereinbelow. Although the specific example in which when such a disturbance factor as to exert an influence on the color deviation phenomenon exists, the degree of influence of the disturbance is detected by the temperature sensor, and the detection result is reflected as a variable has been shown in the embodiment 2, the invention is not limited to it.

In the embodiment, as an environment condition adapted to detect the degree of influence of the disturbance in the image forming apparatus, it is not limited to the temperature but a humidity, a temperature/humidity (moisture amount $g/m^3$: amount which is unconditionally obtained from the temperature and humidity), or the like is detected by a sensor (environment detecting unit). A difference between results detected by the sensor is used as an input variable (dT) of the algorithm function (expression (3)), and the laser beam irradiating position fluctuation is arithmetically operated.

Also in the embodiment, even in the case where it is difficult to find out a correlation between the optical unit and its peripheral temperature change, the laser beam irradiating position fluctuation is predicted and the high image quality can be maintained.

Further, in the case where environment states in and out of the image forming apparatus exert an influence as a disturbance on the laser beam irradiating position fluctuations of the specific colors, their influence degrees are detected by sensors and can be individually fed back to the color deviation prediction algorithms of those colors.

An embodiment 5 will now be described hereinbelow. Although the arithmetic operations by the algorithm functions (expressions (1) to (3)) have been executed by the CPU 321 in the engine control unit in the embodiments 1 to 4, the invention is not limited to it.

In the embodiment, the arithmetic operation by the algorithm function is executed by the CPU 204 of the video controller 200. In this case, the video controller 200 executes the following operation.

First, it is constructed in such a manner that the algorithm function can be stored into the non-volatile storing unit 205 and can be read out therefrom and executed or the algorithm function is notified from the engine control unit and can be executed.

In the case of using the algorithm function (expression (1)) described in the embodiment 1, the information of the operating mode (m) as a parameter necessary for the arithmetic operation is received from the CPU 321 of the printer engine 300 through the engine I/F 325 and the engine I/F 211.

In the case of using the algorithm function (expression (3)) described in the embodiment 2, the information of the operating mode (m) as a parameter necessary for the arithmetic operation is received from the CPU 321 of the printer engine 300. The information of the input variable dT is received from the sensor system 334 including the sensor as an environment detecting unit. Those information is received through the engine I/F 325 and the engine I/F 211.

In the case where the CPU 204 of the video controller 200 executes the arithmetic operations, it is assumed that the parameter table (FIG. 5) has been stored in the non-volatile storing unit 205.

Also in the embodiment, even in the case where it is difficult to find out a correlation between the optical unit and its peripheral temperature change, the laser beam irradiating position fluctuation is predicted and the high image quality can be maintained.

An embodiment 6 will now be described hereinbelow. The invention is not limited to the contents of the embodiments described above.

In the image forming apparatus of the embodiment, the laser scanner of such a system that the laser beams for two stations are scanned by one unit has been used. However, the invention can be applied irrespective of the construction of the laser scanner. The invention can be also arbitrarily applied to a construction in which a dedicated scanner unit is provided every station and to a construction in which the laser beams of four stations are scanned by one laser scanner unit.

Although the invention has been applied to the color deviation phenomenon in the sub-scanning direction in the above embodiments, the invention can be applied irrespective of the main scan or sub-scan. For example, in the case of applying the invention to a color deviation caused by a fluctuation in main scanning magnification, it is sufficient to form an algorithm for predicting a magnification fluctuation and correct the magnification based on a prediction result.

From a viewpoint of coping with the thermal disturbance, the above explanation shows the example of the thermal influence which is subjected from the output paper on the discharge tray 27 has been mentioned in the embodiment 2, and the example in which the temperature difference (dT) between the two temperature sensors 51 and 52 provided in the scanner area is fed back to the arithmetic operation algorithm. However, the invention is not limited to those embodiments. The number of temperature sensors is set to an arbitrary number and their setting positions are not restricted either by the invention.

Although a description is omitted in the above embodiments because it is not an essential point of the invention, an error can occur between the predicted color deviation and the actual color deviation in terms of the construction in which the color deviation fluctuation is predicted by the algorithm. As a method of cancelling the error, the following method of executing what is called a calibration process has been known. According to this method, a calibration pattern is formed by the toner image onto the intermediate transfer belt 34 every predetermined time or every predetermined number of print sheets and the calibration pattern is read out by a sensor, thereby matching the writing timing of each color. In the embodiment of the invention, when the cumulative value of the color deviation fluctuations predicted by the arithmetic operations for the color deviation prediction mentioned before reaches a predetermined value, the calibration process is executed and the error is cancelled. However, the error cancelling method is not limited in the invention but, naturally, the various color deviation correcting methods which have already been known can be applied.

Although the various kinds of embodiments have been described in detail above, the invention may be applied to a system constructed by a plurality of equipment or can be also applied to an apparatus constructed by one equipment. For example, the invention can be applied to a computer system or the like including a printer, a facsimile, a PC, a server, and a client.

The invention is also accomplished by a method whereby a software program for realizing the functions of the embodiments mentioned above is supplied to a system or an apparatus directly or from a remote place, and a computer included in such a system or the like reads out program codes of the supplied program and executes them.

Therefore, the program codes themselves which are installed into the computer in order to realize the functions and processes of the invention by the computer also realize the invention. That is, the computer program itself for realizing the functions and processes is also one of the invention.

In such a case, the form of the program is not limited but any program form such as object codes, program which is executed by an interpreter, script data which is supplied to the OS, or the like may be used so long as it has the function of the program.

As recording media for supplying the program, for example, there are a flexible disk, a hard disk, an optical disk, a magnetooptic disk, an MO, a CD-ROM, a CD-R, a CD-RW, and the like. As recording media, there are also a magnetic tape, a non-volatile memory card, a ROM, a DVD (DVD-ROM, DVD-R), and the like.

The program may be downloaded from a Homepage of the Internet by using a browser of a client computer. That is, the computer program itself of the invention may be downloaded from the Homepage or a compressed file including an automatic installing function can be also downloaded to a recording medium such as a hard disk. The program supplying method of the invention can be also realized by a method whereby the program codes constructing the program of the invention are divided into a plurality of files and the respective files are downloaded from different Homepages. That is, there is a case where a WWW server for allowing a plurality of users to download a program file for realizing the functions and processes of the invention by the computer becomes a component element of the invention.

The program of the invention may be encrypted and stored into a memory medium such as a CD-ROM and distributed to the users. In such a case, only the users who could clear predetermined conditions can be allowed to download key information for decrypting the encryption from the Homepage through the Internet, to decode the encrypted program by using the key information, to execute the program, and to install the program into the computer.

The computer executes the read-out program, so that the functions of the embodiments mentioned above may be realized. The OS or the like which is operating in the computer may execute a part or all of the actual processes based on instructions of the program. Naturally, also in this case, the functions of the embodiments mentioned above can be realized. Further, the program read out of the recording medium may be written into a memory equipped for a function expanding board inserted into the computer or a function expanding unit connected to the computer. A CPU or the like equipped for the function expanding board or the function expanding unit may execute a part or all of the actual processes based on instructions of the program. There is also a case where the functions of the embodiments mentioned above are realized in this manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-317107, filed Dec. 7, 2007, which is hereby incorporated by reference herein in its entirety.

What is claimed is:

1. An image forming apparatus comprising:
a plurality of photosensitive members corresponding to respective colors for forming a color image;
a plurality of optical elements that irradiate laser beams to the plurality of photosensitive members;
a plurality of operating modes including a print mode for executing a printing operation and a standby mode in which the apparatus is now on standby,
wherein a deviation amount of a laser beam irradiating position of the optical element changes gradually due to an influence of a heat in the apparatus and a color deviation is corrected based on the deviation amount obtained by a deviation amount calculation; and
a deviation amount calculator configured to obtain, by an arithmetic operation, the deviation amount between the laser beam irradiating positions for each color, under the condition that the deviation amount increases gradually according to a time lapse in at least one of the plurality of operating modes, according with a further time lapse, the deviation amount between the laser beam irradiating positions for each color decreases gradually, and according with a further time lapse, the deviation amount between the laser beam irradiating positions for each color is converged.

2. An apparatus according to claim 1, wherein the deviation amount calculator obtains, by the arithmetic operation, the deviation amount in one of the plurality of operating modes based on a deviation amount according to a temperature change in a first thermal influence in the image forming apparatus and a deviation amount according to a temperature change in a second thermal influence in the image forming apparatus.

3. An apparatus according to claim 1, wherein the deviation amount calculator obtains the deviation amount by the arithmetic operation every color and every operating mode.

4. An apparatus according to claim 2, further comprising a plurality of environment detecting units which are arranged in the apparatus in order to evaluate a degree of the temperature change in the first thermal influence and a degree of the temperature change in the second thermal influence and detect environment conditions in the apparatus,
wherein the deviation amount calculator obtains, by the arithmetic operation, the deviation amount based on a difference of results detected by the plurality of environment detecting units.

5. An apparatus according to claim 4, further comprising a fan for cooling by flowing air between a discharge unit and an optical unit including the optical element,
wherein the plurality of environment detecting units are a plurality of temperature detecting units, and
wherein one of the plurality of temperature detecting units is arranged between the discharge unit and the optical unit on a downstream side of the air flow by the fan in order to detect a heat of the air which contains a heat from the discharge unit and was flowed by the fan.

6. An apparatus according to claim 1, wherein the deviation amount calculator obtains, by the arithmetic operation, the deviation amount between the laser beam irradiating positions for each of colors without interrupting an image forming operation.

7. An apparatus according to claim 1, wherein the deviation amount calculator obtains, by the arithmetic operation, the deviation amount by a page unit in an image forming operation.

8. A color deviation correcting method of an image forming apparatus comprising:
a plurality of photosensitive members corresponding to respective colors for forming a color image;
a plurality of optical elements for irradiating laser beams to the plurality of photosensitive members; and
a plurality of operating modes including a print mode for executing a printing operation and a standby mode in which the apparatus is now on standby,
wherein a deviation amount of a laser beam irradiating position of the optical element changes gradually due to an influence of a heat in the apparatus and a color deviation is corrected based on the deviation amount obtained by a deviation amount calculation, said method comprising:
a deviation amount calculating step of obtaining, by an arithmetic operation, the deviation amount between the laser beam irradiating positions for each color, under the condition that the deviation amount increases gradually according to a time lapse in at least one of the plurality of operating modes, according with a further time lapse, the deviation amount between the laser beam irradiating positions for each color decreases gradually, and according with a further time lapse, the deviation amount between the laser beam irradiating positions for each color is converged.

9. A non-transitory computer-readable storage medium storing a program for allowing a computer to execute a color deviation correcting method of an image forming apparatus comprising:
a plurality of photosensitive members corresponding to respective colors for forming a color image;
a plurality of optical elements for irradiating laser beams to the plurality of photosensitive members; and
a plurality of operating modes including a print mode for executing a printing operation and a standby mode in which the apparatus is now on standby,
wherein a deviation amount of a laser beam irradiating position of the optical element changes gradually due to an influence of a heat in the apparatus and a color deviation is corrected based on the deviation amount obtained by a deviation amount calculating procedure, and
wherein the program allows the computer to execute a deviation amount calculating procedure of obtaining, by an arithmetic operation, the deviation amount between the laser beam irradiating positions for each color, under the condition that the deviation amount increases gradually according to a time lapse in at least one of the plurality of operating modes, according with a further time lapse, the deviation amount between the laser beam irradiating positions for each color decreases gradually, and according with a further time lapse, the deviation amount between the laser beam irradiating positions for each of colors is converged.

10. An image forming apparatus comprising:

a plurality of photosensitive members corresponding to respective colors for forming a color image;

a plurality of optical elements for irradiating a laser beam to the photosensitive members, wherein a deviation amount of a laser beam irradiating position is different according to a temperature variation due to a time lapse in said image forming apparatus;

a prediction unit that predicts the deviation amount between the laser beam irradiating positions for each color due to a time lapse; and a correction unit that corrects the laser beam irradiating positions for each color based on the deviation amount predicted by said prediction unit.

11. An image forming apparatus comprising:

a photosensitive member;

an optical element for irradiating laser beams to the photosensitive member, wherein a variation amount per a unit time of deviation amounts according to a temperature variation due to a time lapse in said image forming apparatus varies;

a prediction unit that predicts the deviation amount due to a time lapse by a first deviation amount due to a temperature variation and a second deviation amount due to another temperature variation amount whose variation characteristic is different from that of the first deviation amount; and a correction unit that corrects the laser beam irradiating positions based on the deviation amount predicted by said prediction unit.

12. An apparatus according to claim 11, wherein the temperature variation is caused by a thermal influence and another temperature variation is caused by another thermal influence whose temperature variation is different from the first thermal influence.

* * * * *